(12) United States Patent
Zhang et al.

(10) Patent No.: US 12,237,526 B2
(45) Date of Patent: Feb. 25, 2025

(54) BATTERY MODULE AND ENERGY STORAGE APPARATUS

(71) Applicant: DONGGUAN POWERAMP TECHNOLOGY LIMITED, Dongguan (CN)

(72) Inventors: Chunhui Zhang, Dongguan (CN); Yongjian Gao, Dongguan (CN)

(73) Assignee: DONGGUAN POWERAMP TECHNOLOGY LIMITED, Dongguan (CN)

( * ) Notice: Subject to any disclaimer, the term of this patent is extended or adjusted under 35 U.S.C. 154(b) by 936 days.

(21) Appl. No.: 17/218,098

(22) Filed: Mar. 30, 2021

(65) Prior Publication Data

US 2021/0218103 A1 Jul. 15, 2021

Related U.S. Application Data

(63) Continuation of application No. PCT/CN2020/134891, filed on Dec. 9, 2020.

(30) Foreign Application Priority Data

Dec. 9, 2019 (CN) .......................... 201911252886.8

(51) Int. Cl.
*H01M 50/264* (2021.01)
*H01M 50/204* (2021.01)
(Continued)

(52) U.S. Cl.
CPC ....... *H01M 50/264* (2021.01); *H01M 50/204* (2021.01); *H01M 50/291* (2021.01); *H01M 10/0481* (2013.01); *H01M 50/258* (2021.01)

(58) Field of Classification Search
CPC ............. H01M 50/264; H01M 50/204; H01M 50/514; H01M 10/425; H01M 50/258;
(Continued)

(56) References Cited

U.S. PATENT DOCUMENTS 5,409,787 A * 4/1995 Blanyer ................ H01M 10/16 29/623.2
2004/0144908 A1 7/2004 Shannon, Jr.
(Continued)

FOREIGN PATENT DOCUMENTS

CN 101040398 A 9/2007
CN 102593390 A 7/2012
(Continued)

OTHER PUBLICATIONS

"Screw mechanism", Wikipedia, <https://en.wikipedia.org/wiki/Screw_mechanism> accessed year: (Year: 2024).*
(Continued)

*Primary Examiner* — Matthew T Martin
*Assistant Examiner* — Jessie Walls-Murray
(74) *Attorney, Agent, or Firm* — Morgan, Lewis & Bockius LLP

(57) ABSTRACT

A battery module, including N stacked battery cells and fastening members, where each fastening member connects and fastens at least two spaced-apart battery cells, so that a plurality of battery cells are fastened. This application further discloses an energy storage apparatus using the foregoing battery module, where in the foregoing battery module, there are fastening members provided on outer sides of the plurality of battery cells, and each of the fastening members connects and fastens two spaced-apart battery cells. The fastening members are easy to remove and install. By adding battery cells in the stacking direction of the battery cells, and connecting and fastening the battery cells by using the fastening members, a power supply capacity is easy to expand.

10 Claims, 25 Drawing Sheets

(51) Int. Cl.
*H01M 50/258* (2021.01)
*H01M 50/291* (2021.01)
*H01M 10/04* (2006.01)

(58) Field of Classification Search
CPC ............ H01M 50/291; H01M 50/503; H01M 10/0481; B60R 16/04; Y10T 70/5858
See application file for complete search history.

(56) References Cited

U.S. PATENT DOCUMENTS

| | | | | |
|---|---|---|---|---|
| 2006/0159988 | A1* | 7/2006 | Kang | H01M 50/51 429/158 |
| 2007/0141460 | A1* | 6/2007 | You | H01M 50/211 429/185 |
| 2011/0151308 | A1* | 6/2011 | Yoon | H01M 10/0481 429/151 |
| 2012/0301775 | A1* | 11/2012 | Lachenmeier | H01M 50/209 429/153 |
| 2019/0237722 | A1* | 8/2019 | Gao | H01M 50/209 |

FOREIGN PATENT DOCUMENTS

| | | |
|---|---|---|
| CN | 102712388 A | 10/2012 |
| CN | 203367388 U | 12/2013 |
| CN | 104795609 A | 7/2015 |
| CN | 206099077 U | 4/2017 |
| CN | 206370447 U | 8/2017 |
| CN | 107863471 A | 3/2018 |
| CN | 107994159 A | 5/2018 |
| CN | 108475746 A | 8/2018 |
| CN | 207818635 U | 9/2018 |
| CN | 108867850 | 11/2018 |
| CN | 208570760 U | 3/2019 |
| CN | 208589484 U | 3/2019 |
| CN | 208819968 U | 5/2019 |
| CN | 209104226 U | 7/2019 |
| CN | 110306885 A | 10/2019 |
| EP | 1812982 A1 | 8/2007 |
| EP | 2056375 B1 | 9/2010 |
| EP | 3151307 A1 | 4/2017 |
| EP | 3522313 A1 | 8/2019 |
| JP | S56161778 U | 12/1981 |
| JP | 2005116433 A | 4/2005 |
| JP | 2008516406 A | 5/2008 |
| JP | 2009105010 A | 5/2009 |
| JP | 2014044817 A | 3/2014 |
| JP | 2014060111 A | 4/2014 |
| JP | 2015132341 A | 7/2015 |
| JP | 2021517623 A | 7/2021 |
| KR | 20120026701 A | 3/2012 |
| TW | M320604 U | 10/2007 |
| WO | WO2006/052063 A1 | 5/2006 |
| WO | WO2013/080136 | 6/2013 |
| WO | WO2018/059267 A1 | 4/2018 |
| WO | WO2019/132224 | 7/2019 |

OTHER PUBLICATIONS

International Search Report and Written Opinion, PCT/CN2020/134891, Mar. 11, 2021, 8 pgs.—No Translation Available.
Dongguan Xinneng An science Co. Ltd., First Office Action, CN201911252886.8, Nov. 10, 2021, 18 pgs.
Dongguan Poweramp Technology Limited, Examination Report No. 1 for Patent Application, AU2020399038, Jun. 7, 2022, 7 pgs.
Dongguan Poweramp Technology Limited, Examination Report No. 2 for Patent Application, AU2020399038, Aug. 26, 2022, 5 pgs.
Dongguan Poweramp Technology Limited, Notice of Acceptance for Patent Application, AU2020399038, Jan. 4, 2023, 4 pgs.
First Office Action, CN201911252886.8, Sep. 2, 2022, 5 pgs.
Second Office Action, CN201911252886.8, Jun. 1, 2022, 11 pgs.
Dongguan Poweramp Technology Limited, Extended European Search Report, EP20866916.8, Aug. 25, 2022, 6 pgs.
Dongguan Poweramp Technology Limited, Supplementary Partial European Search Report, EP20866916.8, May 4, 2022, 7 pgs.
Dongguan Poweramp Technology Limited, Communication Pursuant to Rule 164(1) EPC, EP20866916.8, May 25, 2022, 2 pgs.
Notice of Reasons for Refusal, P2021-517623, Mar. 22, 2022, 12 pgs.
Notice of Reasons for Refusal, P2021-517623, Oct. 25, 2022, 6 pgs.
Decision to Grant JP2021-517623, Apr. 25, 2023, 6 pgs.

* cited by examiner

BATTERY MODULE AND ENERGY STORAGE APPARATUS

CROSS REFERENCE TO RELATED APPLICATIONS

This application is a continuation application of PCT Patent Application No. PCT/CN2020/134891, filed on Dec. 9, 2020, which claims priority to Chinese Patent Application No. 201911252886.8, filed with the State Intellectual Property Office of the People's Republic of China on Dec. 9, 2019, all of which are incorporated herein by reference in their entirety.

TECHNICAL FIELD

This application relates to the field of power supply, and in particular, to a battery module and an energy storage apparatus.

BACKGROUND

A power supply system used for supplying power generally includes a plurality of battery cells. A cabinet with a housing is designed to carry the plurality of battery cells, and a fastening mechanism for fixing the battery cells in the cabinet needs to be designed. Electrical connection between the battery cells is implemented by cables routed in the cabinet, for example. Installation of the plurality of battery cells in limited space of the cabinet is troublesome, and cable routing is messy. Moreover, the space in the cabinet is not adjustable, and no more battery cells can be installed, resulting in difficulty in expanding a power supply capacity of the entire power supply system.

SUMMARY

In view of this, it is necessary to provide a battery module and an energy storage apparatus.

A battery module includes N stacked battery cells and fastening members, where N is greater than or equal to 3, and the fastening member connects and fastens at least two spaced-apart battery cells.

According to some embodiments of this application, the fastening member is locked to at least two spaced-apart battery cells.

According to some embodiments of this application, the battery module includes a plurality of fastening members, where each of the fastening members connects and fastens at least two spaced-apart battery cells, and the plurality is greater than or equal to 2.

According to some embodiments of this application, in a stacking direction of the plurality of battery cells, every two adjacent odd-numbered battery cells are connected by using the fastening member, and every two adjacent even-numbered battery cells are connected by using the fastening member.

According to some embodiments of this application, the each fastening member is provided with a plurality of spaced-apart connecting portions; where two connecting portions located on two ends are respectively connected to two battery cells located on two ends of the plurality of battery cells; and among rest connecting portions, two adjacent connecting portions are respectively connected to two spaced-apart battery cells.

According to some embodiments of this application, the battery cell connects four fastening members, and every two fastening members are located on a side of the battery cell and separately disposed on two opposite ends of the battery cell.

According to some embodiments of this application, the fastening member includes an extension rod, and a length of the extension rod in the stacking direction of the plurality of battery cells is configured of being retractably adjusted and fixed.

According to some embodiments of this application, the fastening member includes a first connecting member, a second connecting member, and an adjusting member, where the first connecting member is connected to one battery cell, the second connecting member is connected to another battery cell, and two ends of the adjusting member are respectively connected to the first connecting member and the second connecting member for adjusting a spacing between the first connecting member and the second connecting member.

According to some embodiments of this application, a first stud is provided on one end of the first connecting member; a second stud is provided on one end of the second connecting member; thread rotation directions of the first stud and the second stud are opposite; and the adjusting member is provided with a threaded hole, where the threaded hole is threaddedly connected to the first stud and the second stud.

According to some embodiments of this application, the adjusting member is a spring, and two ends of the adjusting member are respectively fastened to the first connecting member and the second connecting member.

According to some embodiments of this application, the first connecting member is provided with a guide portion, the second connecting member is provided with a guide hole, and the guide portion is slidably disposed in the guide hole.

According to some embodiments of this application, the fastening member is provided with a retaining portion, a hook is provided on an outer wall of the battery cell, hooks on the two battery cells connected to the fastening member are in opposite directions, and the retaining portion is configured to be clamped into the hook for fastening connection.

According to some embodiments of this application, the fastening member is provided with a protruding buckle, a buckle hole is provided on an outer wall of the battery cell, and the buckle is buckled with the buckle hole for fastening connection.

According to some embodiments of this application, a jack is provided on an outer wall of the battery cell, and the fastening member is provided with a plug pin and a drive member, where the drive member is configured to control the plug pin to extend out of the fastening member and plug into the jack, or configured to control the plug pin to retract and detach from the battery cell.

According to some embodiments of this application, the battery cell is provided with two spaced-apart snap rings, and retractable plug pins are respectively provided on two opposite sides of the fastening member; and the two plug pins respectively configured to extend into the two snap rings on the battery cell when extending, and detach from the snap rings when retracting.

According to some embodiments of this application, a first hole and a third hole are respectively provided on two ends of the fastening member, a second hole is provided on an outer wall of the battery cell, and a fastener penetrates through and connects the first hole, the second hole, and the third hole.

According to some embodiments of this application, a carrying portion is provided on an outer wall of the battery cell for carrying the fastening member, and the fastening member is configured to be rotated around the carrying portion until the fastening member is connected to two spaced-apart battery cells.

According to some embodiments of this application, the carrying portion includes two pillars provided on the outer wall of the battery cell, where pillars of two adjacent battery cells are staggered, the fastening member is provided with two retaining grooves, the two retaining grooves penetrates through a side of the fastening member, and the two retaining grooves are configured to be retained by the pillar.

According to some embodiments of this application, the carrying portion includes a rotating shaft and a pillar respectively provided on the outer wall of the battery cell, one end of the fastening member is rotatably disposed on the rotating shaft and is capable of sliding in an axial direction of the rotating shaft, and the other end of the fastening member is configured to be retained by the pillar and retained by another pillar provided on the battery cell.

According to some embodiments of this application, the carrying portion includes a sliding hole and a retaining hole respectively provided on the outer wall of the battery cell, where the sliding hole includes an introduction portion and a fastening portion that intersecting with the introduction portion, two ends of the fastening member are each provided with a chuck, one chuck is configured to be entering from the introduction portion and sliding along the introduction portion to the fastening portion, the other chuck is capable of entering the retaining hole and being retained by the outer wall of the battery cell, and by moving and rotating the fastening member, the two chucks of the fastening member enter and are retained in the fastening portions of the two battery cells.

According to some embodiments of this application, a positioning portion and a positioning groove are respectively provided on both sides of the battery cell in the stacking direction, and the positioning portion of the battery cell is retained in a positioning groove of another adjacent battery cell, so that two adjacent battery cells are relatively positioned.

According to some embodiments of this application, the battery cell is provided with an accommodating groove at a top corner, and the fastening member is filled in the accommodating groove and abuts against a groove wall of the accommodating groove.

According to some embodiments of this application, at least one fastening member is connected to one side of the battery cell, at least one fastening member is connected to the other side of another battery cell, and fastening members provided in different battery cells and on different sides are connected.

According to some embodiments of this application, in a direction in which the plurality of battery cells are stacked, two adjacent battery cells are electrically connected.

According to some embodiments of this application, the two battery cells are electrically connected through a hot-plug component, where the hot-plug component includes a hot-plug male end and a hot-plug female end, and in the two adjacent battery cells, one battery cell is provided with the hot-plug male end, and the other battery cell is provided with the hot-plug female end.

According to some embodiments of this application, the N stacked battery cells are carried on a platform, and the battery module further includes a shackle, where the shackle is provided on at least one battery cell and is configured to connect a fastening mechanism.

This application further proposes an energy storage apparatus, including any one of the foregoing battery modules and a battery management unit, where the battery management unit is provided on the battery module for monitoring and managing the battery module.

In the foregoing battery module, there are fastening members provided on outer sides of the plurality of battery cells, and each of the fastening members connects and fastens two spaced-apart battery cells. The fastening members are easy to remove and install. By adding battery cells in the stacking direction of the battery cells, and connecting and fastening the battery cells by using the fastening members, a power supply capacity is easy to expand.

Figure 1:
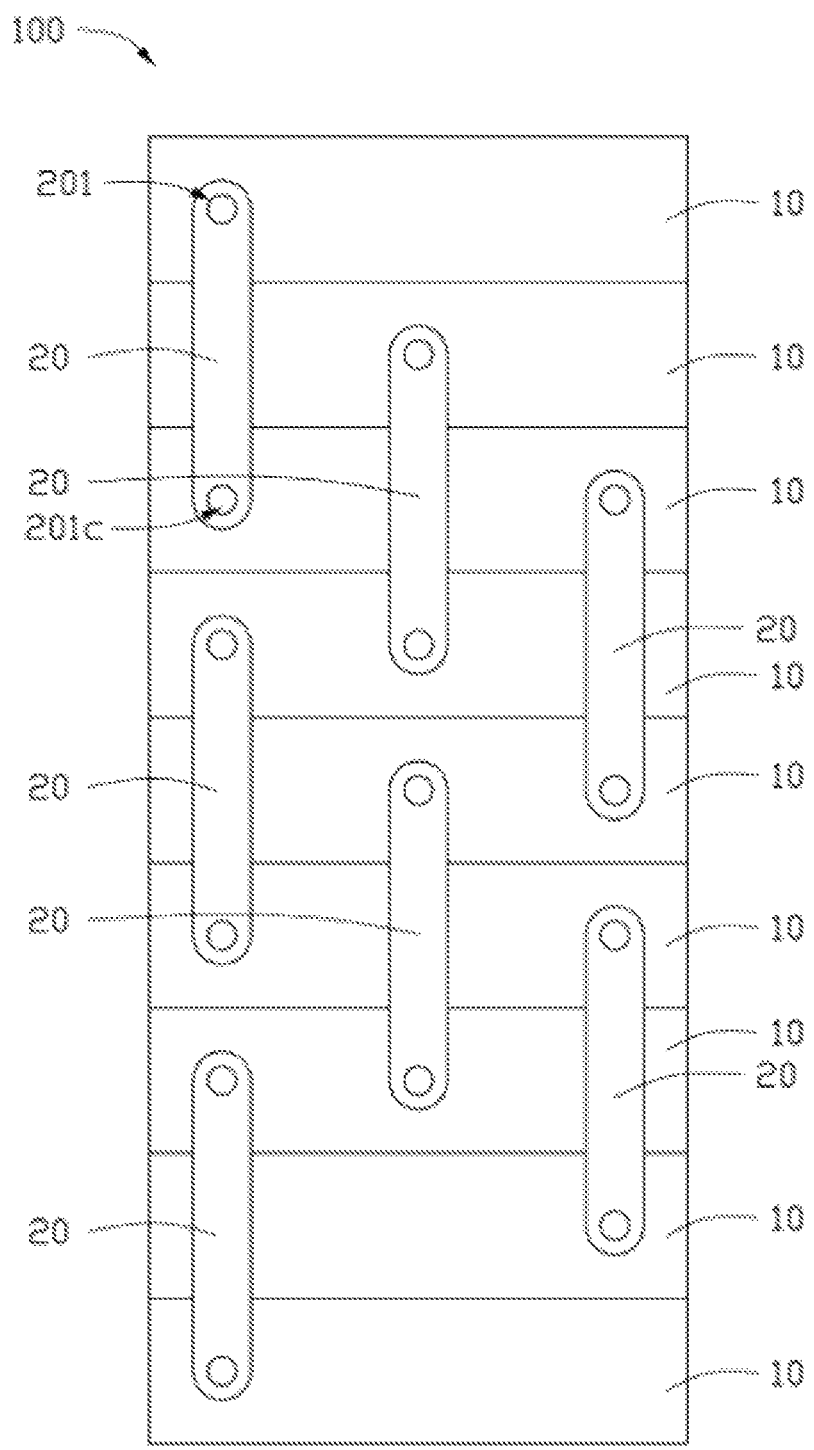
FIG. 1 is a schematic structural diagram of a battery module according to a first embodiment of this application.

Reference signs of main components:
battery module 100, 100a, 100a1, 100b, 100c, 100d, 100e, 100f, 100g, 100h, 100i, 100j
battery cell 10, 10a, 10h
base 11
positioning groove 111
positioning portion 113
cover body 13
sealing gasket 15
hot-plug component 17, 17a
hot-plug male end 171, 171a
hot-plug female end 173, 173a
buckle hole 101
jack 102
hook 103
groove 1031
opening 1033
carrying portion 104e, 104f, 104g
pillar 1041
rotating shaft 1043
sliding hole 1044
introduction portion 1045
fastening portion 1046
retaining hole 1047
accommodating groove 105
snap ring 106
fastening member 20, 20a, 20b, 20c, 20d, 20f, 20g, 20h, 20i
first hole 201
buckle 201a
plug pin 201b
third hole 201c
connection portion 202
drive member 203, 203a
retaining portion 204
first connecting member 21c, 21d
first stud 211
guide portion 213
second connecting member 22c, 22d
second stud 221
adjusting member 23c, 23d
retaining groove 205
chuck 206
first connecting portion 207
second connecting portion 208
shackle 30
platform 301
fastening mechanism 302

This application will be further described with reference to the accompanying drawings in the following specific embodiments.

DESCRIPTION OF EMBODIMENTS

The following clearly describes the technical solutions in the embodiments of this application with reference to the accompanying drawings in the embodiments of this application. Apparently, the described embodiments are only a part rather than all of the embodiments of this application. All other embodiments obtained by a person of ordinary skill in the art based on the embodiments of this application without creative efforts shall fall within the protection scope of this application.

Unless otherwise defined, all technical and scientific terms used herein shall have the same meanings as commonly understood by those skilled in the art to which this application belongs. The terms used herein in the specification of this application are only used to describe specific embodiments, and are not intended to limit this application.

The following describes in detail some embodiments of this application with reference to the accompanying drawings. In absence of conflicts, the following embodiments and features in the embodiments may be combined.

First Embodiment

Referring to FIG. 1, a battery module 100 includes N sequentially stacked battery cells 10 and fastening members 20, where N is greater than or equal to 3. The battery cells 10 are configured to supply electrical energy. The fastening member 20 connects and fastens at least two spaced-apart battery cells 10, so that the two battery cells 10 and the battery cell 20 located therebetween are fastened.

In the battery module 100, there are fastening members 20 provided on outer sides of the plurality of battery cells 10, and each of the fastening members 20 connects and fastens two spaced-apart battery cells 10. The fastening members 20 are easy to remove and install. Further, the fastening member 20 fastens the two spaced-apart battery cells 10 through fastening. When the supplied electric energy needs to be increased, a quantity of battery cells 10 in a stacking direction of the battery cells 10 is simply increased, and the battery cells 10 are installed on the outside of the battery cell 10 by using the fastening members 20.

A first hole 201 and a third hole 201c are respectively provided on two ends of the fastening member 20. A second hole (not shown in the figure) is provided on an outer wall of the battery cell 10. A fastener (not shown in the figure) is used to penetrate and connect the first hole 201, the second hole, and the third hole 201c, and is connected to the second hole through the first hole 201 and the third hole 201c, so that the fastening member 20 connects and fastens the battery cell 10. The fastener is a screw, but it is not limited thereto.

In the illustrated embodiment, the two spaced-apart battery cells 10 are connected and fastened through one fastening member 20. It can be understood that in other embodiments, the two spaced-apart battery cells 10 may alternatively be connected and fastened through two, three, or other quantity of fastening members 20, to enhance connection stability.

The quantity of the fastening member 20 is a plurality, and the plurality is greater than or equal to 2. In the stacking direction of the plurality of battery cells 10, every two adjacent odd-numbered battery cells 10 are connected through the fastening member 20. Every two even-numbered battery cells 10 are connected through the fastening member 20.

Figure 2:
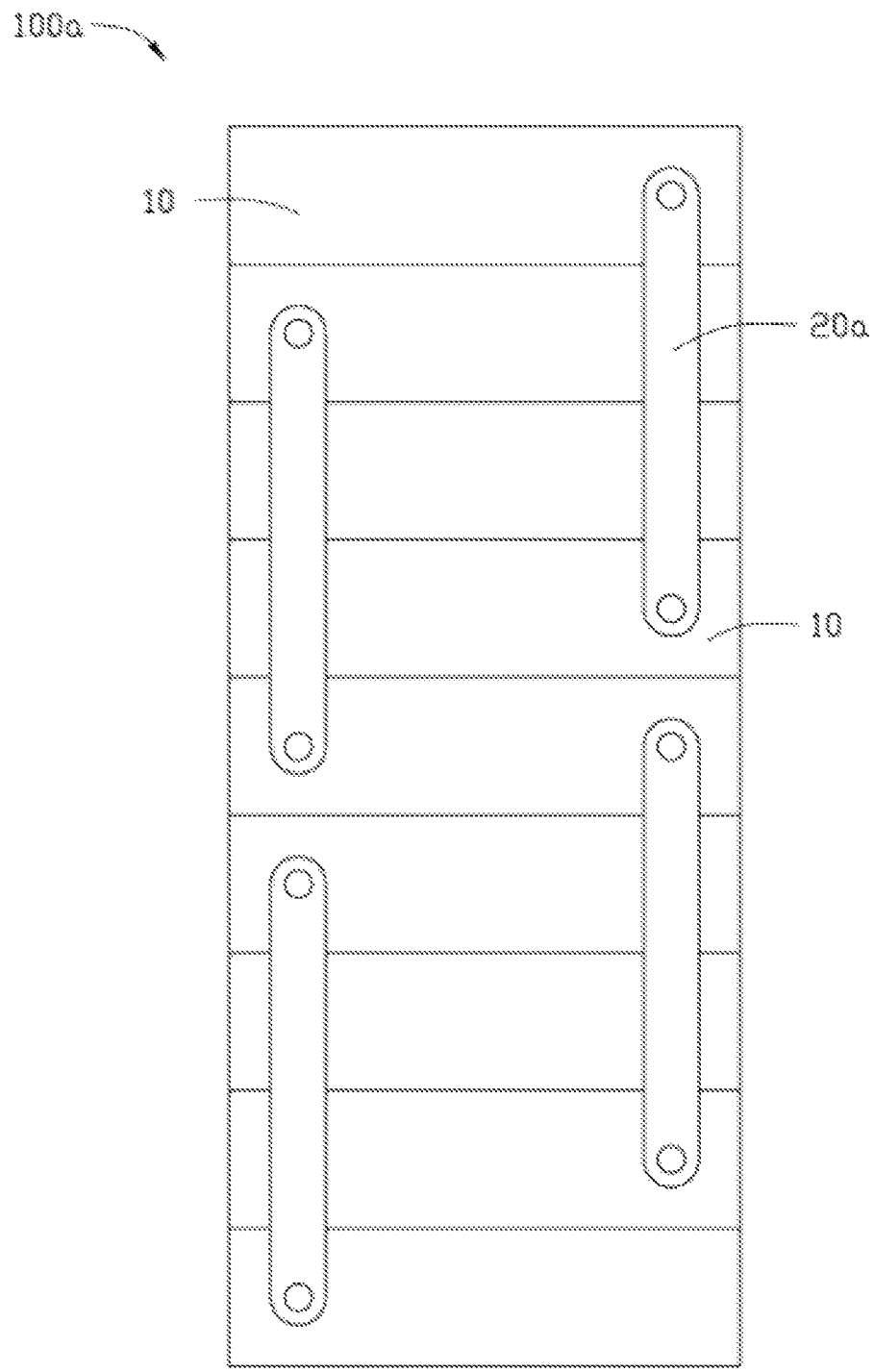
FIG. 2 is a schematic structural diagram of a battery module according to other embodiments.

A quantity of battery cells 10 between two battery cells 10 connected to each fastening member 20 may be greater than or equal to one, so that the two battery cells 10 connected to the fastening member 20 are not adjacently arranged. For example, the battery module 100 includes nine battery cells 10, and sorted sequence numbers of the battery cells 10 from bottom to top are 1 to 9, and the two battery cells 10 with sorted sequence numbers 1 and 3, 2 and 4, 3 and 5, 4 and 6, 5 and 7, and 7 and 9 are connected through the fastening members 20, as shown in FIG. 1. In other embodiments, the quantity of the battery cells 10 in the battery module 100 may alternatively be four, and the two battery cells 10 with sorted sequence numbers 1 and 3, and 2 and 4 are connected through the fastening members 20. In another embodiment, a battery module 100a includes nine battery cells 10, and two battery cells 10 with sorted sequence numbers 1 and 4, 2 and 5, 5 and 8, and 6 and 9 are connected through fastening members 20a, as shown in FIG. 2.

A plurality of stacked battery cells 10 of the battery module 100 are connected in a staggered manner, a linkage structure is formed between the plurality of battery cells 10, so that two adjacent battery cells 10 are not disconnected, enhancing connection stability of the plurality of battery cell 10.

Figure 3:
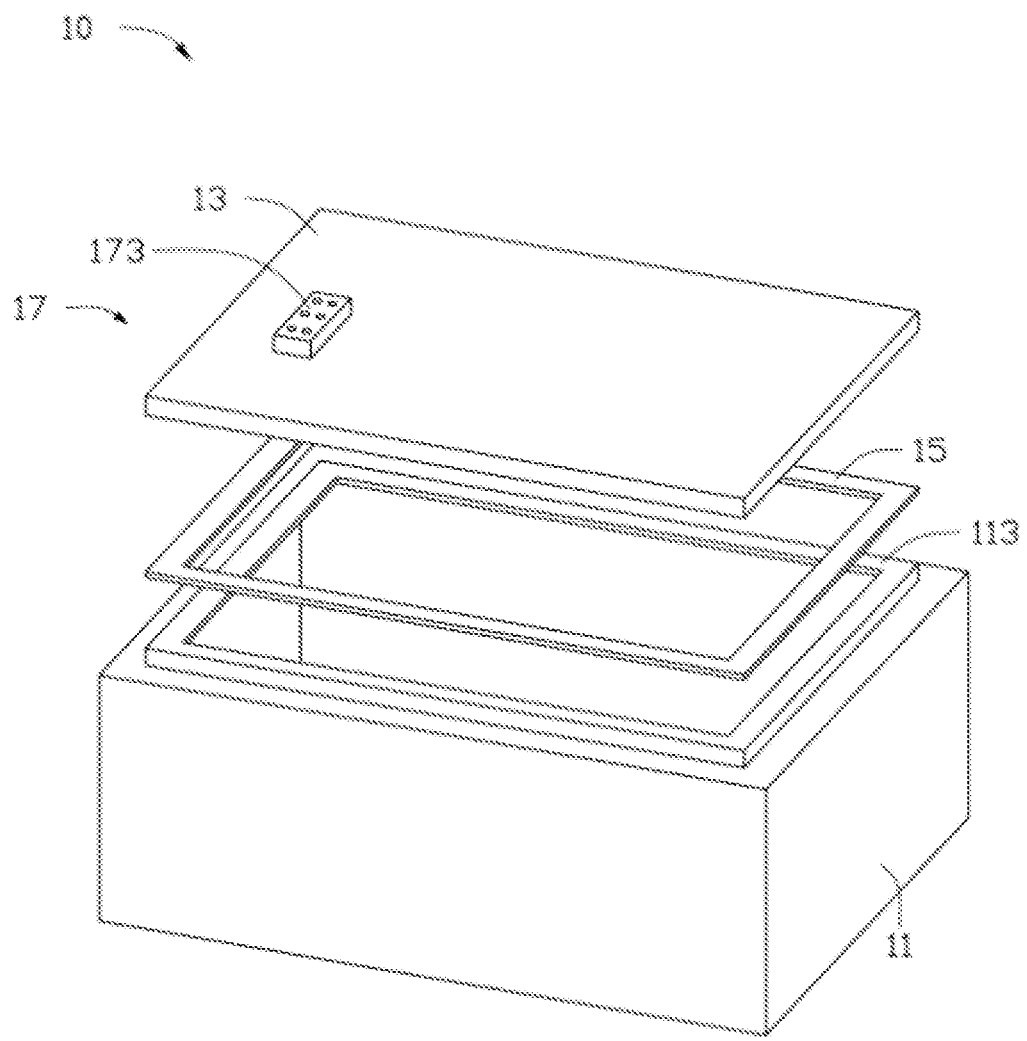
FIG. 3 is a schematic structural exploded view of a battery cell of the battery module shown in FIG. 1.
Figure 4:
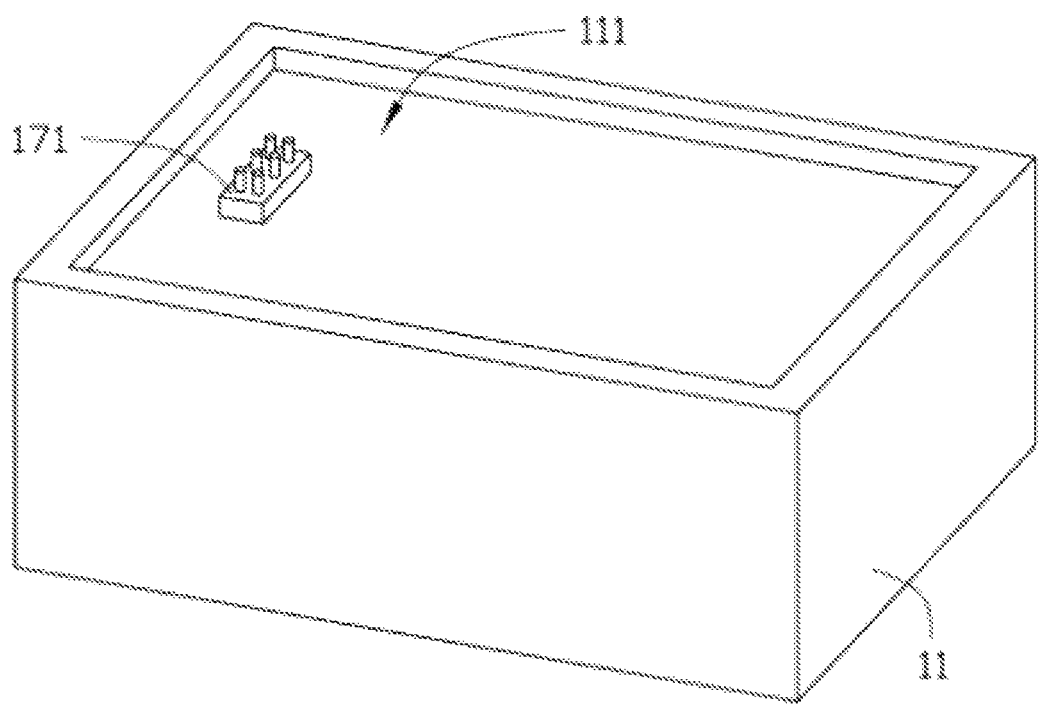
FIG. 4 is a schematic structural diagram of a base of a battery cell shown in FIG. 2.

Referring to both FIG. 3 and FIG. 4, the battery cell 10 includes a base 11, a cover body 13, a sealing gasket 15, and a battery pack (not shown in the figure). The battery pack is configured to supply electrical energy. The battery pack is disposed within the base 11. The sealing gasket 15 is arranged between the base 11 and the cover body 13. The cover body 13 is connected to the base 11 and seals the base 11. A positioning groove 111 is provided on a side of the base 11 away from the cover body 13, and a positioning portion 113 is provided on an end of the base 11 facing the cover body 13. The positioning portion 113 of the battery cell 10 is retained in the positioning groove 111 of another adjacent battery cell 10, so that the two adjacent battery cells 10 cannot rotate or move in a plane, and relative positioning is achieved. It can be understood that in other embodiments, the positioning groove 111 and the positioning portion 113 may alternatively be omitted.

The two adjacent battery cells 10 are electrically connected. Specifically, the two adjacent battery cells 10 are electrically connected through a hot-plug component 17. The hot-plug component 17 includes a hot-plug male end 171 and a hot-plug female end 173. The battery pack is electrically connected to the hot-plug male end 171 and the hot-plug female end 173 through wires (not shown in the figure). The hot-plug male end 171 is disposed in the positioning groove 111 of the base 11. The hot-plug female end 173 is disposed on the cover body 13. Among the two adjacent battery cells 10, the hot-plug male end 171 of one battery cell 10 and the hot-plug female end 173 of the other battery cell 10 move in the stacking direction to achieve a plug-in connection, but is not limited thereto.

Figure 5:
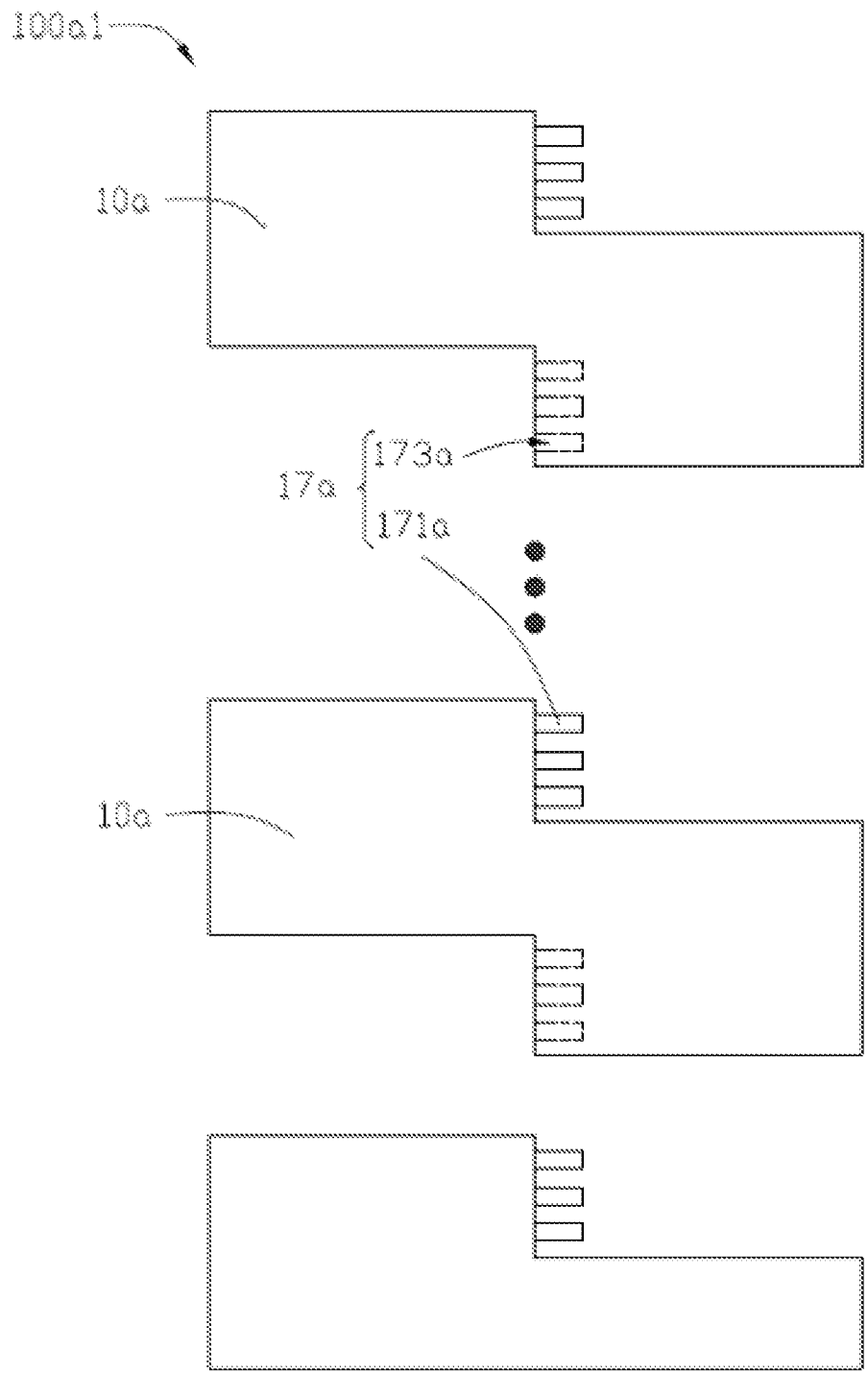
FIG. 5 is a schematic structural exploded view of a battery cell according to other embodiments.

Referring to FIG. 5, in other embodiments, a battery module 100al includes a plurality of battery cells 10a stacked in sequence. In two adjacent battery cells 10a, one battery cell 10a is provided with a hot-plug male end 171a on a side perpendicular to the stacking direction, and the other battery cell 10a is provided with a hot-plug female end 173a on a side perpendicular to the stacking direction. The hot-plug male end 171a and the hot-plug female end 173a are arranged opposite to each other, so that the two are moved in a direction perpendicular to the stacking direction to achieve a plug-in connection. It can be understood that in other embodiments, an angle formed by a plug-in direction of the hot-plug component 17a with respect to the stacking direction may also be an acute angle or an obtuse angle.

Figure 6:
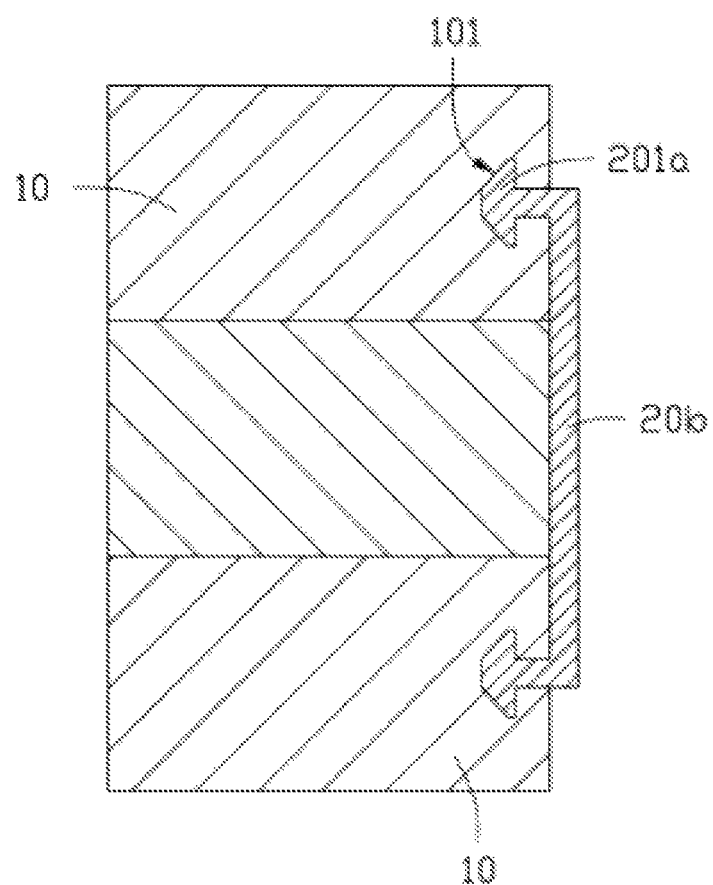
FIG. 6 to FIG. 8 are schematic structural diagrams of a fastening member of a battery module in different embodiments.

Referring to FIG. 6, in another embodiment, the fastening member 20 is provided with a protruding buckle 201a. A buckle hole 101 is provided on an outer wall of the battery cell 10. The buckle 201a is buckled with the buckle hole 101 for fastening connection.

Figure 7:
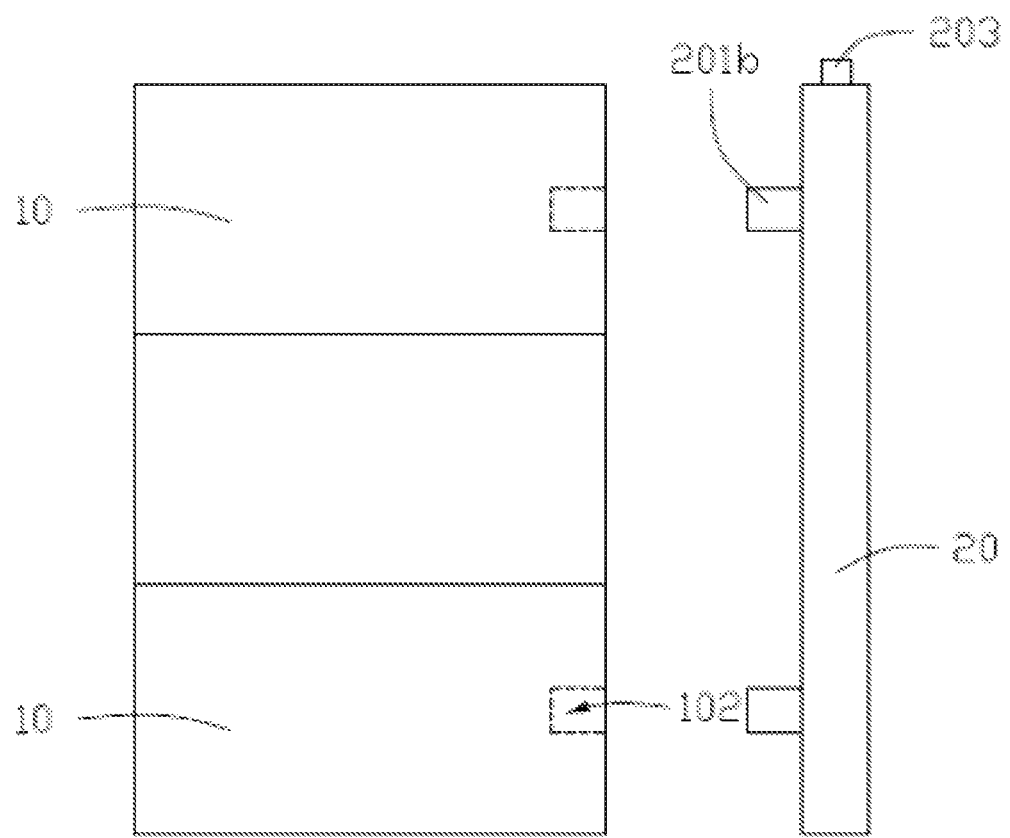

Referring to FIG. 7, in another embodiment, a jack 102 is provided on an outer wall of the battery cell 10. The fastening member 20 is provided with a plug pin 201b and a drive member 203. The drive member 203 controls the plug pin 201b to extend out of the fastening member 20 and to be plugged into the jack 102. Two plug pins 201b are plugged into sockets 102 on the two battery cells 10 respectively, so that the fastening member 20 connects and fastens the two spaced-apart battery cells 10. When the drive member 203 is pressed to move down, the drive member 203 controls the plug pin 201b to retract into the fastening member 20, so that the plug pin 201b is detached from the battery cell 10. The fastening member 20 releases connection and fastening of the two battery cells 10.

Figure 8:
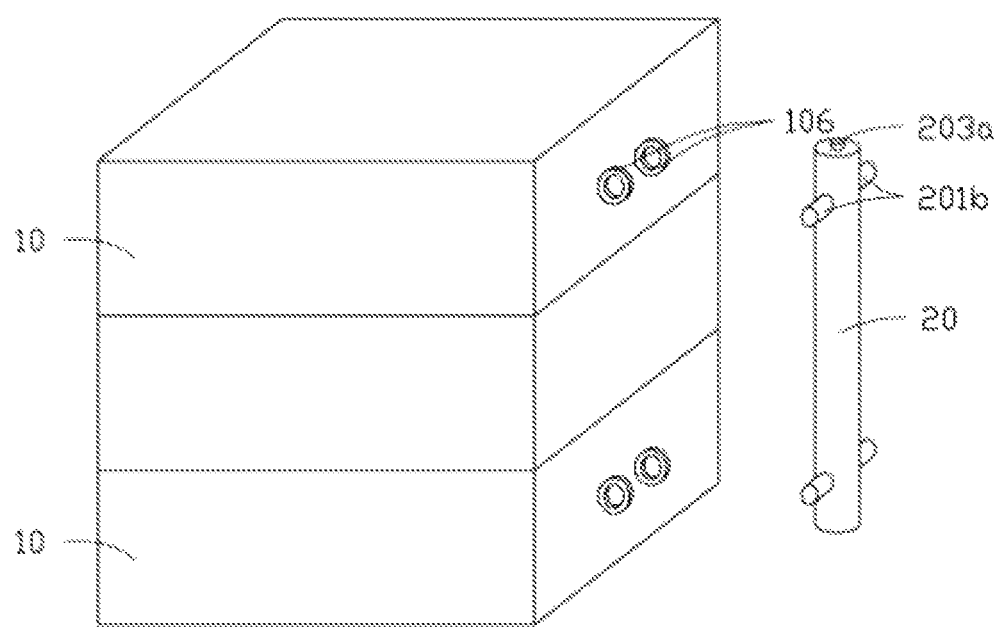

Referring to FIG. 8, in another embodiment, the battery cell 10 is provided with two spaced-apart snap rings 106. Retractable plug pins 201b are respectively provided on two opposite sides of the fastening member 20. For example, the plug pin 201b is slidably disposed on the fastening member 20 in a radial direction. An elastic member (not shown) is used between two plug pins 201b located on opposite sides of the fastening member 20 for butting, and the elastic member drives the two plug pins 201b to extend out of the fastening member 20 in a natural state. Pressing the two plug pins 201b enables the plug pins 201b to retract inwards the fastening member 20, and the plug pins 201b are retractably arranged on the fastening member 20. When the two oppositely arranged plug pins 201b extend, they can respectively extend into the two snap rings 106 on the battery cell 10 to connect and fasten the fastening member 20 to the battery cell 10. When the two oppositely arranged plug pins 201b retract, they can be detached from the snap rings 106, so that the fastening member 20 is disconnected from the battery cell 10.

The two spaced-apart battery cells 10 are each provided with two snap rings 106. The fastening member 20 is provided with four plug pins 201b. Every two plug pins 201b are configured to cooperate with two snap rings 106 on one battery cell 10 so that the fastening member 20 connects and fastens two battery cells 10.

Another drive member 203a is further provided on the fastening member 20. The plug pin 201b uses the another drive member 203a to control its expansion and retraction. When the drive member 203a is pressed to move down, the drive member 203a controls the plug pins 201b to retract into the fastening member 20, so that the plug pins 201b are detached from the battery cell 10. The plug pins 201b extend by releasing pressing of the drive member 203a. It can be understood that in other embodiments, the drive member 203a may alternatively be omitted.

Second Embodiment

Figure 9:
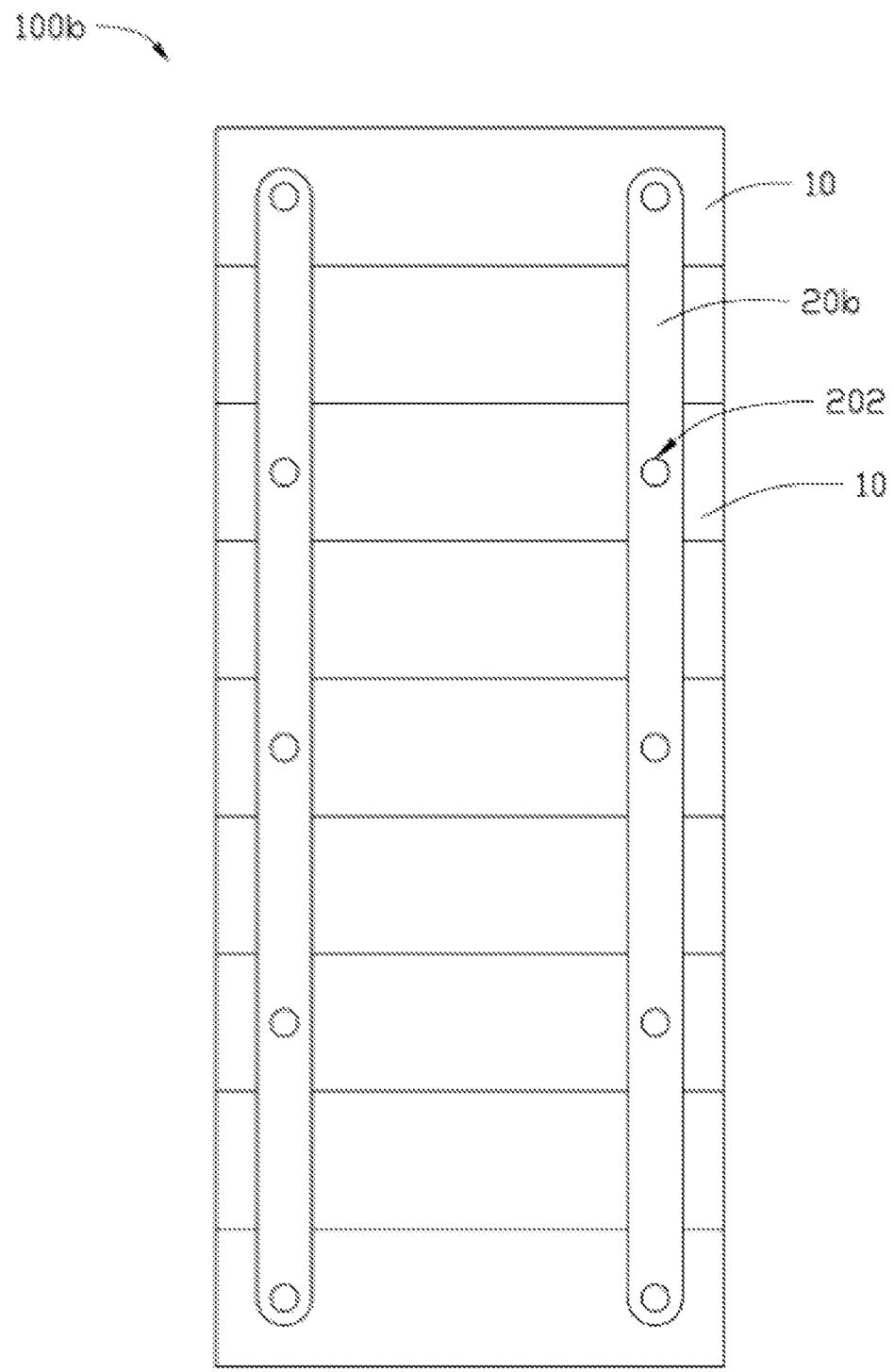
FIG. 9 is a schematic structural diagram of a battery module according to a second embodiment of this application.

Referring to FIG. 9, a battery module 100b includes fastening members 20b and a plurality of battery cells 10. The fastening member 20b is provided with a plurality of spaced-apart connecting portions 202. Two connecting portions 202 on two ends of the fastening member 20b are respectively connected to two battery cells 10 located at the two ends of the plurality of battery cells 10. Among the remaining connecting portions 202, two adjacent connecting portions 202 are respectively connected to two spaced-apart battery cells 10.

Figure 10:
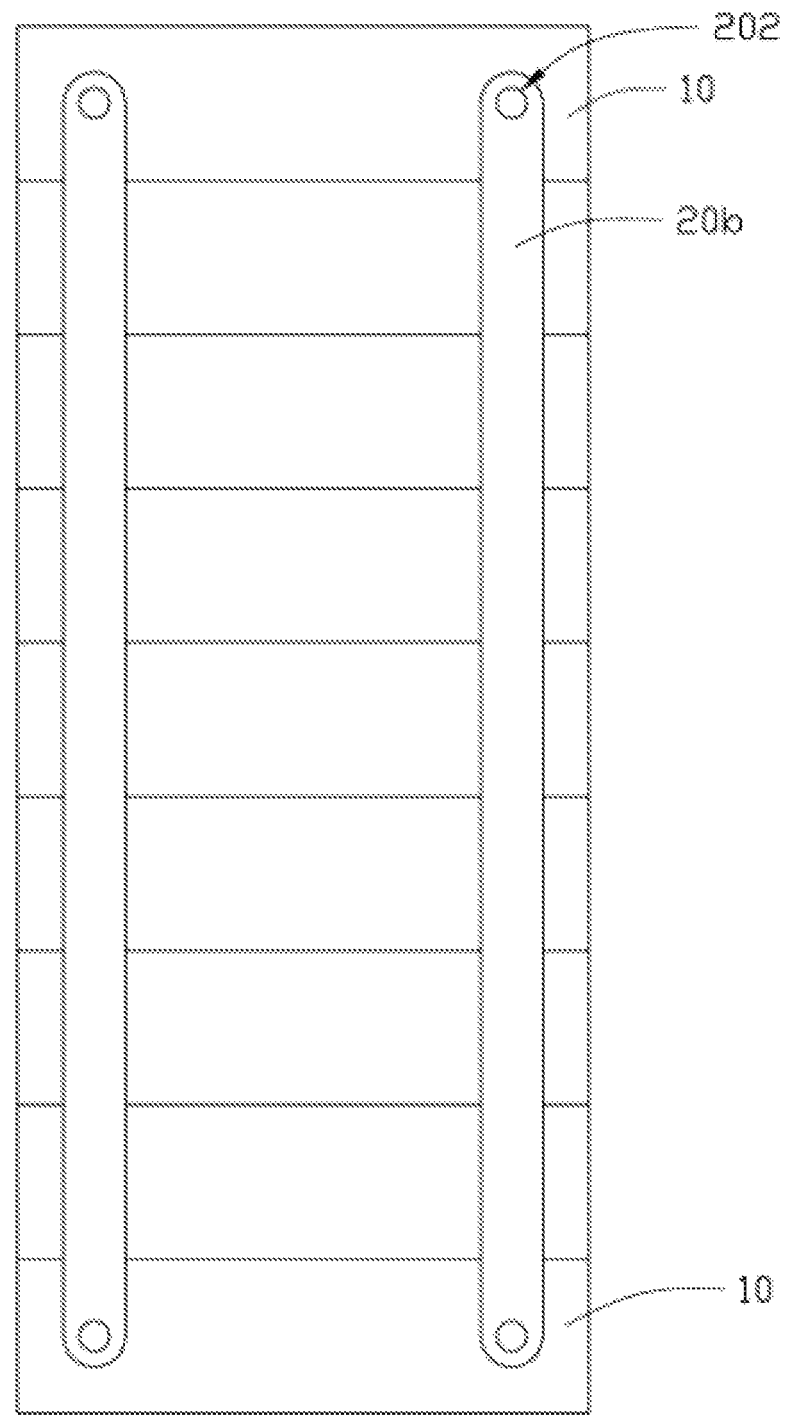
FIG. 10 is a schematic structural diagram of a battery module according to other embodiments.

It can be understood that a quantity of the connecting portions 202 may alternatively be two, and the two connecting portions 202 are respectively connected to the two battery cells 10 located at the two ends of the plurality of battery cells 10, as shown in FIG. 10.

A quantity of fastening members 20b is four. Every two fastening members 20b are located on a side of the battery cell 10 and separately disposed on two opposite ends of the battery cell 10. It can be understood that in other embodiments, the quantity of the fastening members 20b may be one or other numbers.

The connecting portion 202 has a round-hole structure, and a screw (not shown in the figure) passes through the connecting portion 202 to connect to a hole provided on the battery cell 10, so that the fastening member 20b connects and fastens the battery cell 10.

It can be understood that in other embodiments, the connecting portion 202 may alternatively be a long-hole structure (not shown in the figure). The screw can pass through the connecting portion 202 and move within the connecting portion 202 to adjust a position of the screw, so that the screw is aligned with a hole on the battery cell 10.

Third Embodiment

Figure 11:
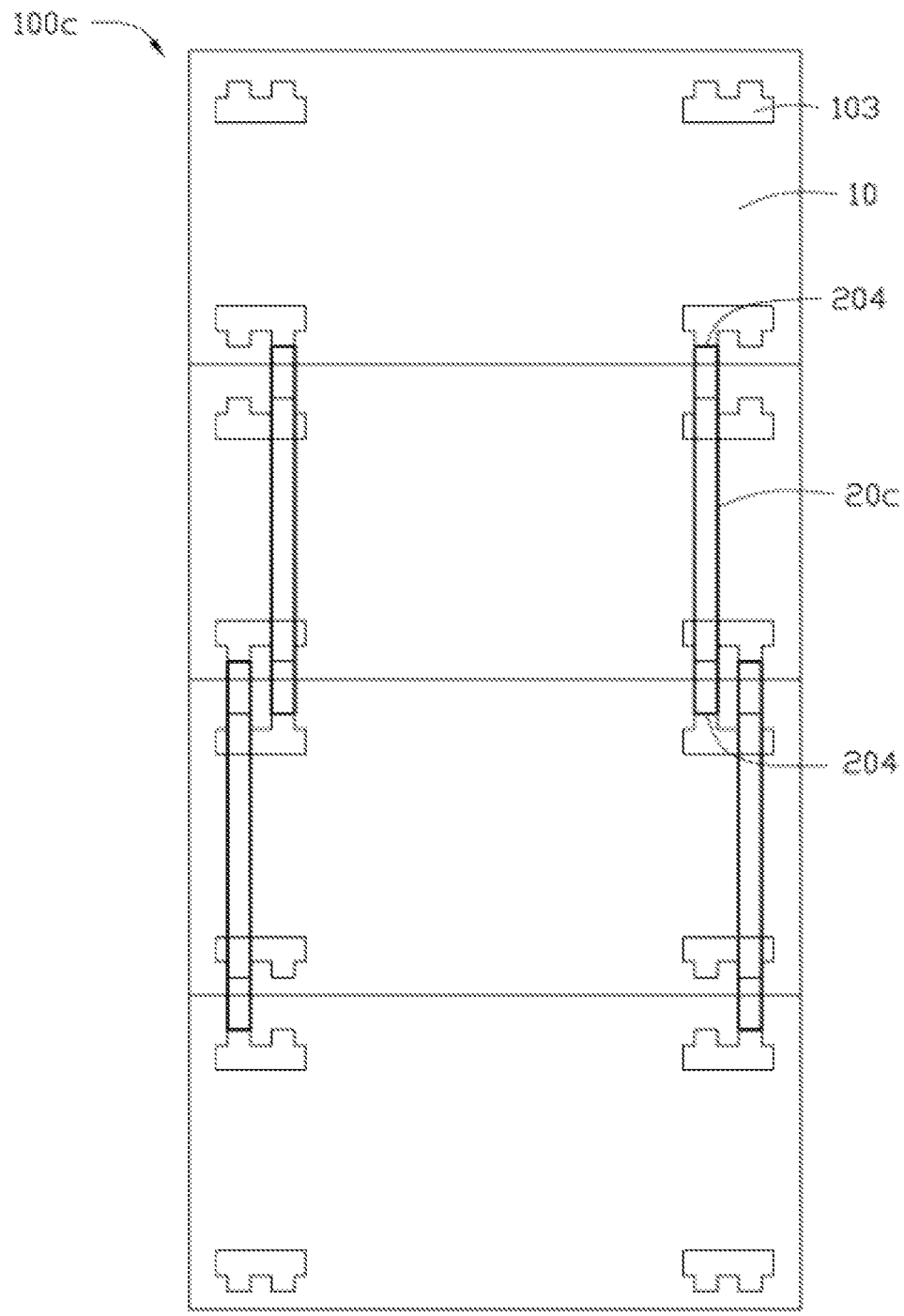
FIG. 11 is a schematic structural diagram of a battery module according to a third embodiment of this application.
Figure 12:
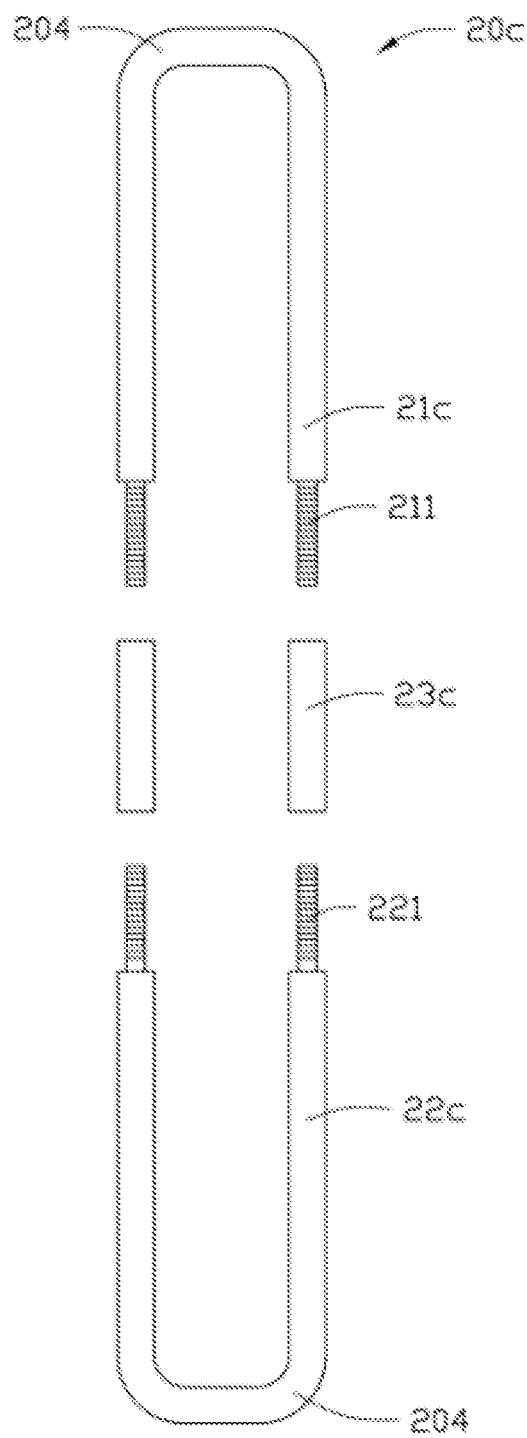
FIG. 12 is a schematic structural exploded view of a fastening member of the battery module shown in FIG. 11.
Figure 13:
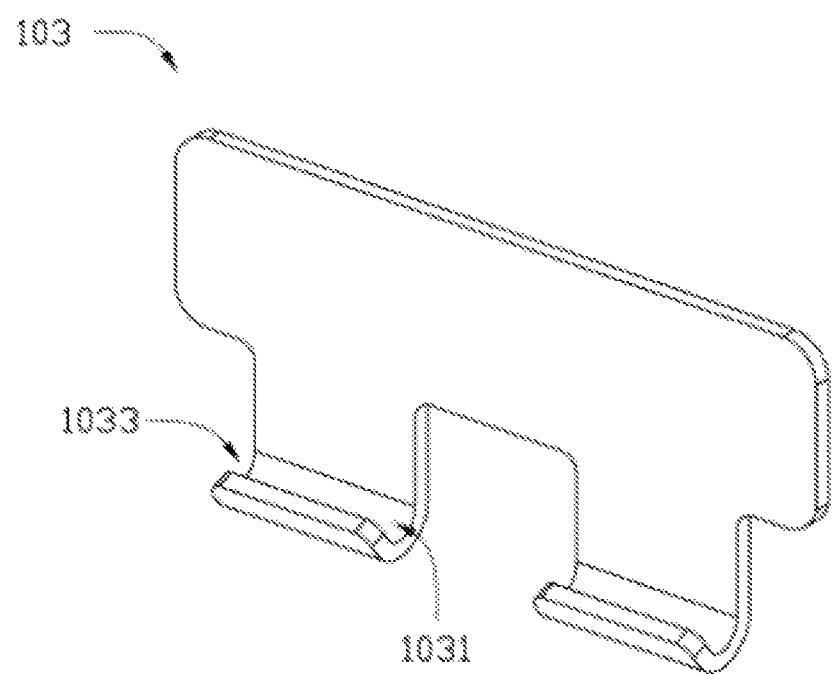
FIG. 13 is a schematic structural diagram of a hook on a battery cell of the battery module shown in FIG. 11.

Referring to FIG. 11 to FIG. 13, a battery module 100c includes a plurality of stacked battery cells 10 and fastening members 20c. Two ends of the fastening member 20c are each provided with a retaining portion 204. A hook 103 is provided on an outer wall of the battery cell. The retaining portion 204 can be clamped into the hook 103, so that the fastening member 20c is fixedly connected to the battery cell 10. The hook 103 has a substantially plate-shaped structure, and an end of the hook 103 is bent to form a groove 1031. The retaining portion 204 is clamped into the groove 1031. Directions of hooks 103 on two battery cells 10 respectively connected to the fastening member 20c are opposite. Specifically, the battery cells 10 are provided with two hooks 103 in the stacking direction, and openings of the grooves 1031 of the two hooks 103 are arranged opposite each other. The fastening member 20c applies a tensile force on the two battery cells 10, so that the two battery cells 10 and the battery cell 10 located therebetween are fastened.

The fastening member 20c is substantially a cyclic structure, and its two ends are respectively hitched on the corresponding hooks 103 on the battery cell 10 and clamped into the groove 1031, but it is not limited thereto. For example, in other embodiments, the fastening member 20c may alternatively be a rod-shaped structure, protruding portions extending to one side are provided on two ends of the fastening member, and the fastening member 20c is clamped into the groove 1031 of the hooks 103 by using the protruding portions, so that the fastening member 20c connects and fastens the battery cell 10.

A length of the fastening member 20c in the stacking direction of the plurality of battery cells 10 can be retractably adjusted and fixed. Specifically, the fastening member 20c includes a first connecting member 21c, a second connecting member 22c, and an adjusting member 23c. The first connecting member 21 is connected to one battery cell 10. The second connecting member 22c is connected to the other battery cell 10. Two ends of the adjusting member 23c are connected to the first connecting member 21c and the second connecting member 22c, respectively, and a tensile force is applied to the first connecting member 21c and the second connecting member 22c respectively to adjust a spacing between the first connecting member 21c and the second connecting member 22c, so that the two battery cells 10 move towards each other to be fastened.

The first connecting member 21c and the second connecting member 22c are U-shaped structures, but are not limited thereto. The adjusting member 23c is connected to the first connecting member 21c and the second connecting member 22c to form a cyclic fastening member 20c. The first connecting member 21c and the second connecting member 22c are each provided with a retaining portion 204 at an end away from the adjusting member 23c, so that the fastening member 20c connects and fastens the two spaced-apart battery cells 10.

A first stud 211 is provided on an end of the first connecting member 21c away from the retaining portion 204. A second stud 221 is provided on an end of the second connecting member 22c away from the retaining portion 204. The adjusting member 23c is provided with a threaded hole (not shown in the figure). The threaded hole is threadedly connected with the first stud 211 and the second stud 221. Threads of the first stud 211 and the second stud 221 are opposite in direction.

The adjusting member 23c is rotated, so that the first connecting member 21c and the second connecting member 22c move away from each other at the same time to increase a distance between the two, and the two retaining portions 204 can be clamped into the corresponding hooks 103. The adjusting member 23c is rotated, so that the first connecting member 21c and the second connecting member 22c move toward each other at the same time to reduce the distance between the two, and thus the two retaining portions 204 can hold the hooks 103 to further enable the fastening member 20c to hold and fasten the two battery cells 10.

Each battery cell 10 is provided with eight hooks 103, and one hook 103 is provided on each side of the battery cell 10 to enhance connection stability. Each hook 103 forms two spaced-apart grooves 1031 for retaining and fastening two fastening members 20c.

Fourth Embodiment

Figure 14:
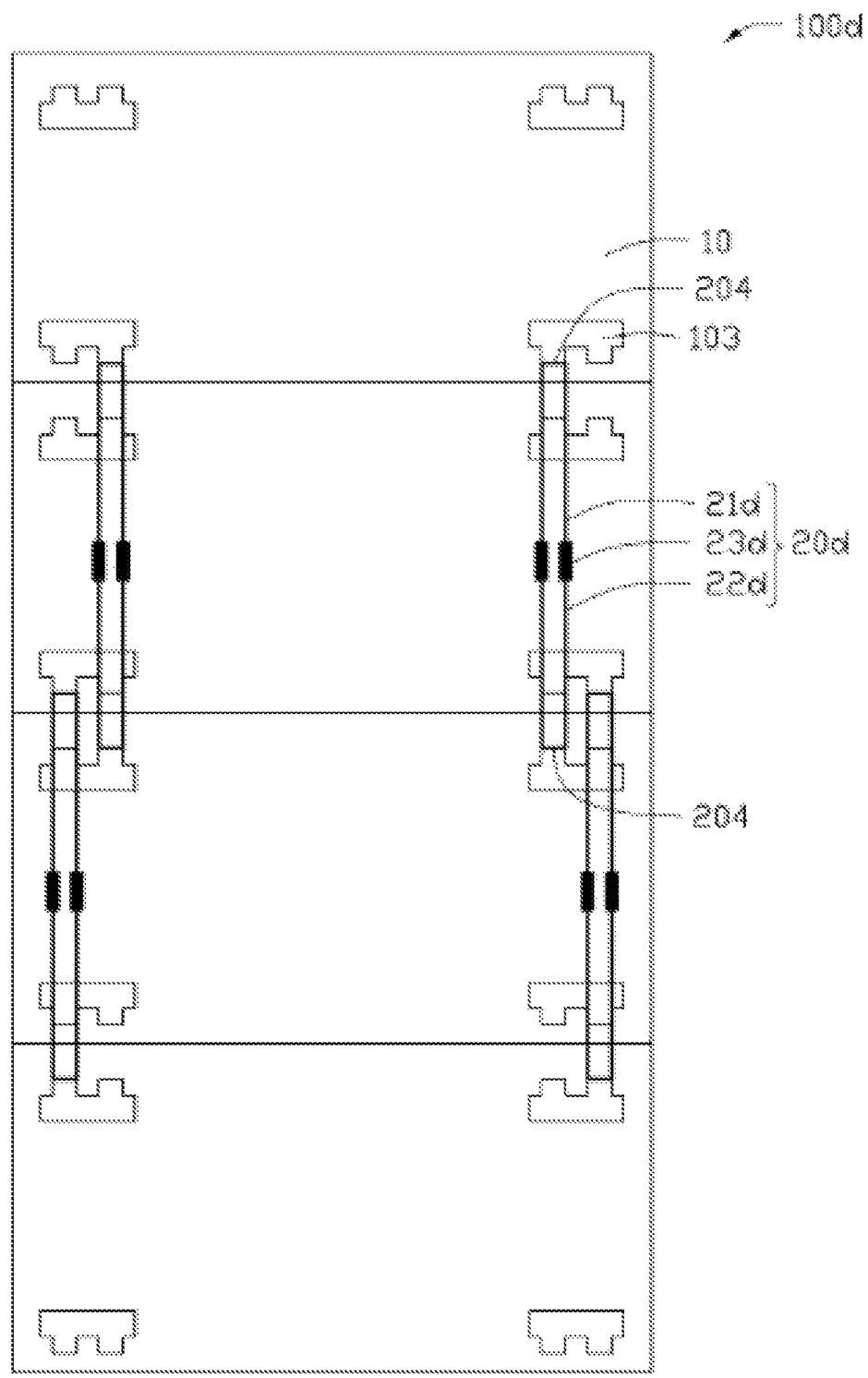
FIG. 14 is a schematic structural diagram of a battery module according to a fourth embodiment of this application.
Figure 15:
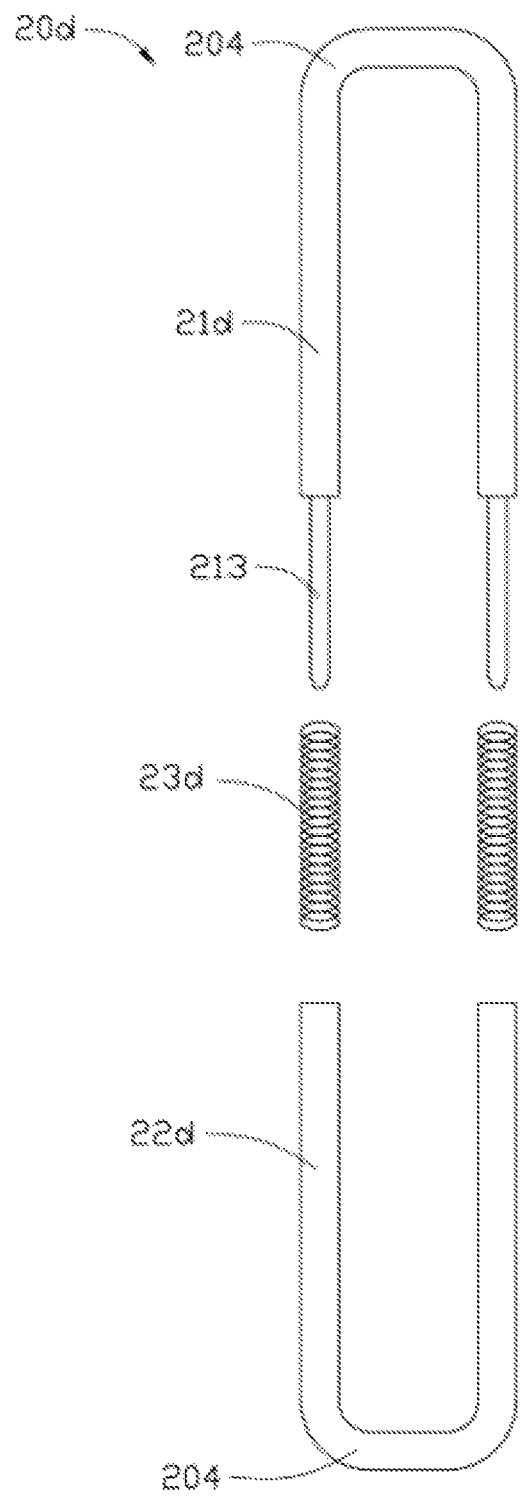
FIG. 15 is a schematic structural exploded view of a fastening member of the battery module shown in FIG. 14.

Referring to both FIG. 14 and FIG. 15, a structure of a battery module 100d is substantially the same as that of the battery module 100c in the third embodiment. A difference lies in that structures of a fastening member 20d and the fastening member 20c are different.

The fastening member 20d includes a first connecting member 21d, a second connecting member 22d, and an adjusting member 23d. The adjusting member 23d is a spring. Two ends of the adjusting member 23d are respectively fixed on the first connecting member 21d and the second connecting member 22d. The first connecting member 21d is provided with a guide portion 213. The second connecting member 22d is provided with a guide hole (not shown in the figure). The guide portion 213 is slidably disposed in the guide hole. It can be understood that in other embodiments, the guide hole and the guide portion 213 may alternatively be omitted.

The adjusting member 23c applies a tensile force to the first connecting member 21d and the second connecting member 22d, so that the two retaining portions 204 hold the hooks 103 to further enable the fastening member 20c to hold and fasten the two battery cells 10.

Fifth Embodiment

Figure 16:
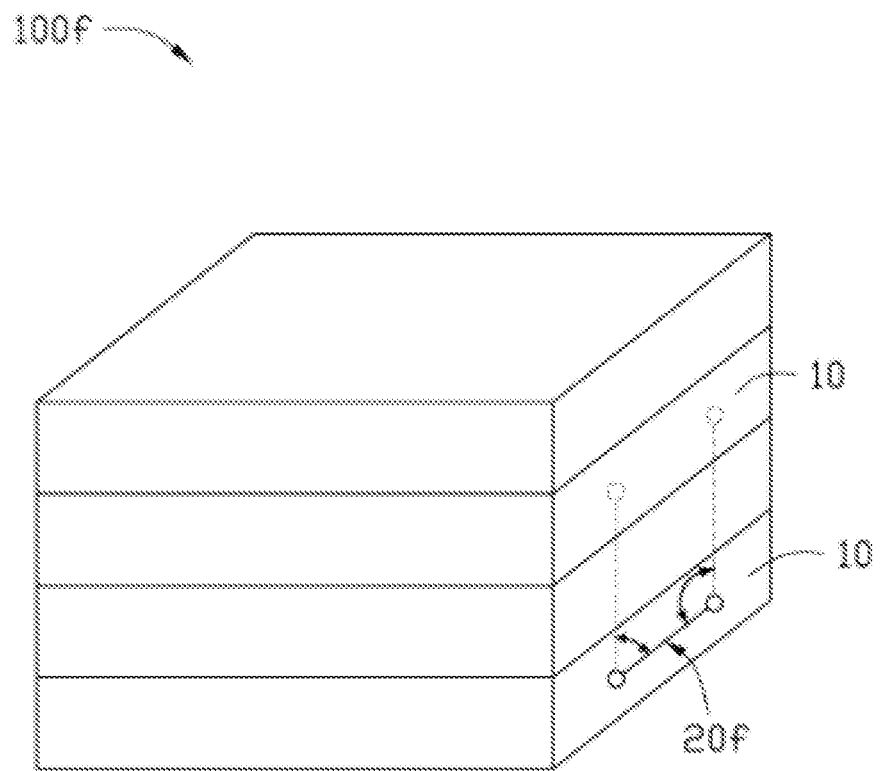
FIG. 16 is a schematic structural diagram of a battery module according to a fifth embodiment of this application.

Referring to FIG. 16, a fastening member 20f of a battery module 100f, when not in use, is movably installed on one of the battery cells 10. When the fastening member 20e is in use, it can rotate in two directions, so that its two ends are respectively connected to two spaced-apart battery cells 10.

Figure 17:
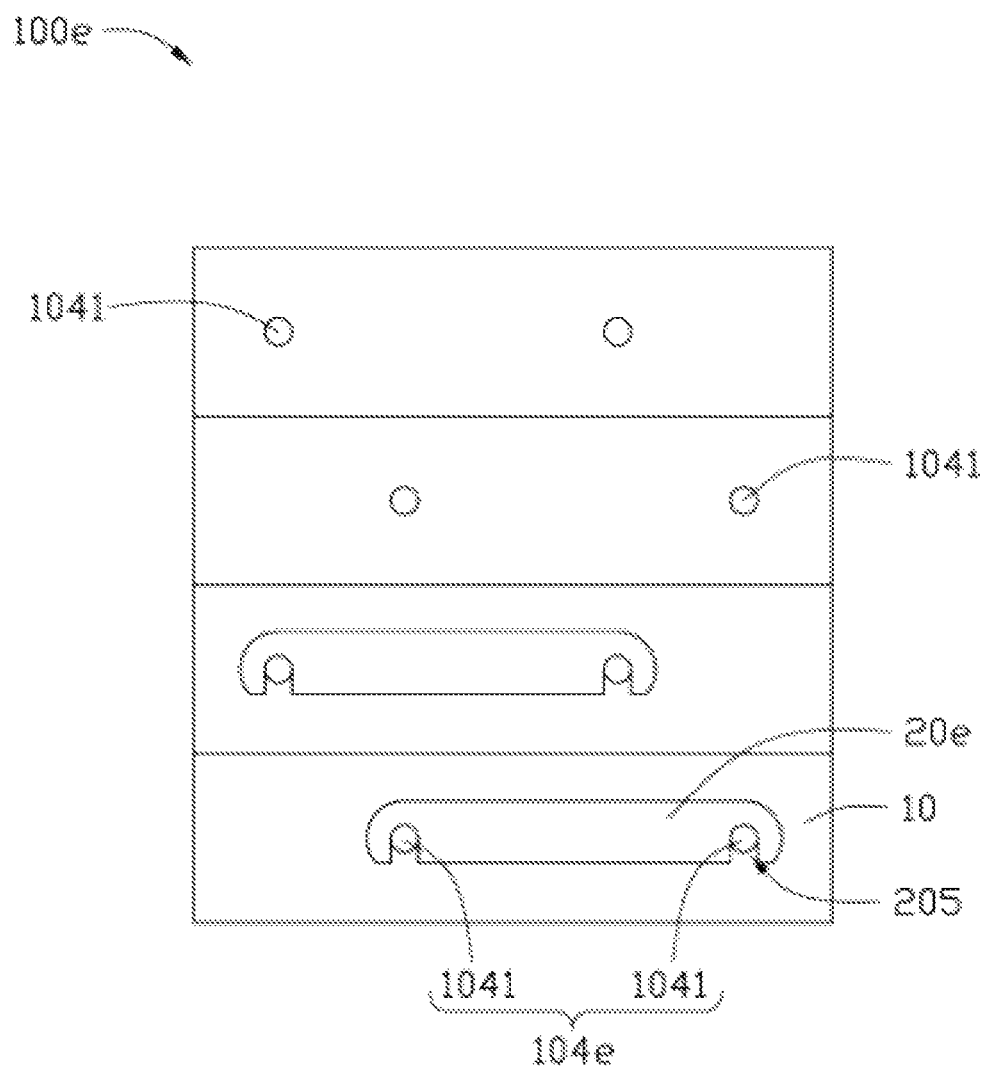
FIG. 17 and FIG. 18 are schematic structural diagrams of the battery module shown in FIG. 16 before and after fastening members are used.

Referring to FIG. 17, the battery module 100e includes four stacked battery cells 10. Two battery cells 10 with sorted sequence numbers 1 and 3, and 2 and 4 are connected and fastened by the fastening member 20e. One side of each of the two battery cells 10 with sorted sequence numbers 1 and 2 each carry a fastening member 20e. A carrying portion 104e is provided on an outer wall of the battery cell 10. One end of the fastening member 20e abuts against the carrying portion 104e and can rotate around the carrying portion 104e, so that the other end of the fastening member 20e rotates to be connected and fastened to another battery cell 10.

Figure 18:
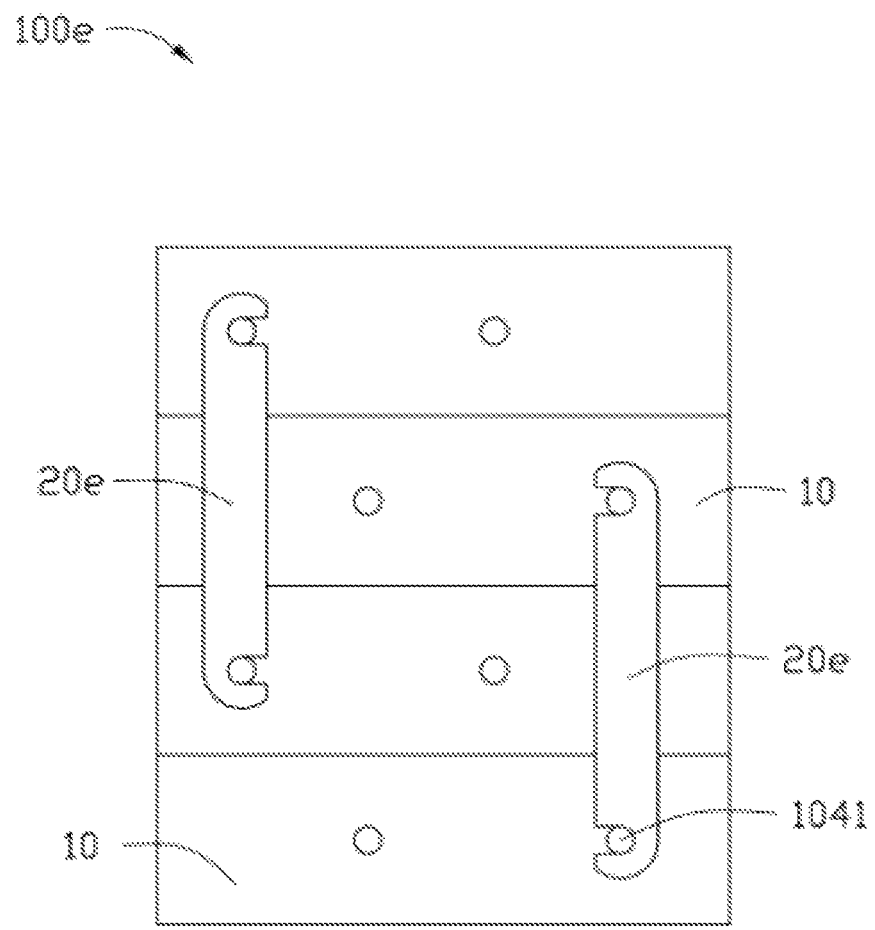

The carrying portion 104e includes two pillars 1041 provided on the outer wall of the battery cell 10. The fastening member 20e is provided with two retaining grooves 205. The retaining groove 205 penetrates through one side of the fastening member 20e. The retaining groove 205 is retained by the pillar 1041. Pillars 1041 on the two adjacent battery cells 10 are arranged in a staggered manner, corresponding to positions of the pillars 1041 on the two battery cells 10 connected to the fastening member 20e. When the fastening member 20e is not in use, the pillar 1041 can enter from one side of the retaining groove 205, so that the fastening member 20e is carried on the carrying portion 104e, as shown in FIG. 17. When the fastening member 20e is in use, it can rotate around any of the pillars 1041 of the carrying portion 104e, so that the retaining grooves 205 of the fastening member 20e are respectively retained by the pillars 1041 on the two spaced-apart battery cells 10, as shown in FIG. 18.

It can be understood that in other embodiments, when the fastening member 20e is in use, the fastening member 20e may alternatively be detached from the carrying portion 104e, and then the retaining grooves 205 of the fastening member 20e are retained by and installed on two pillars 1041 of the two spaced-apart battery cells 10.

Sixth Embodiment

Figure 19:
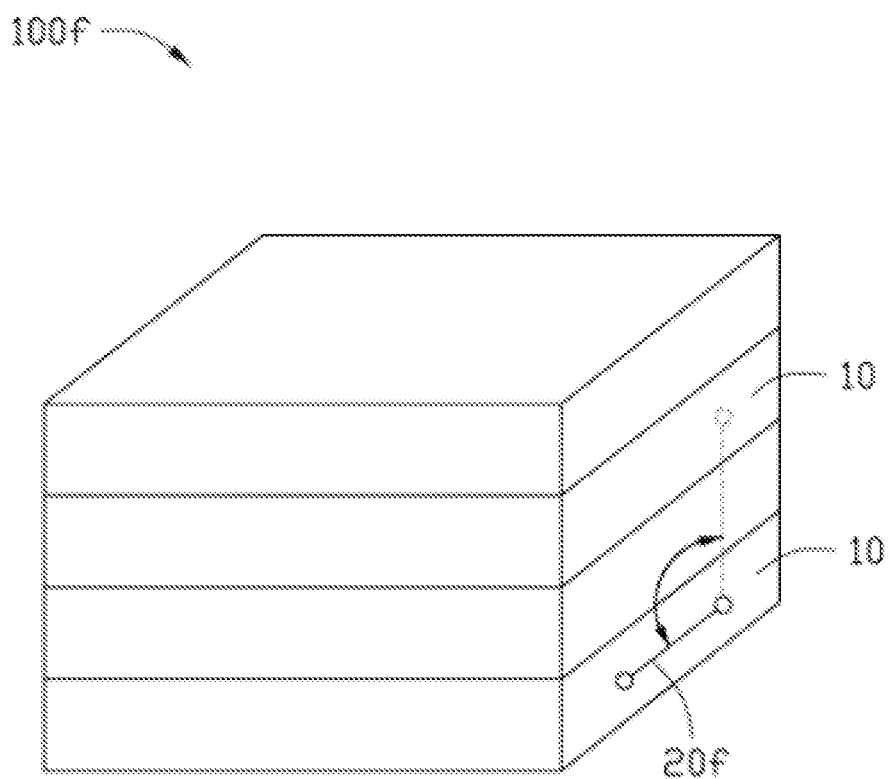
FIG. 19 is a schematic structural diagram of a battery module according to a sixth embodiment of this application.

Referring to FIG. 19, one end of a fastening member 20f in the battery module 100f is rotatably provided on an outer wall of a battery cell 10; and the other end of the fastening member 20f can be carried on the battery cell 10 when the fastening member 20f is not in use, and can be rotated to be connected and fastened to another battery cell 10 when the fastening member 20f is in use.

Figure 20:
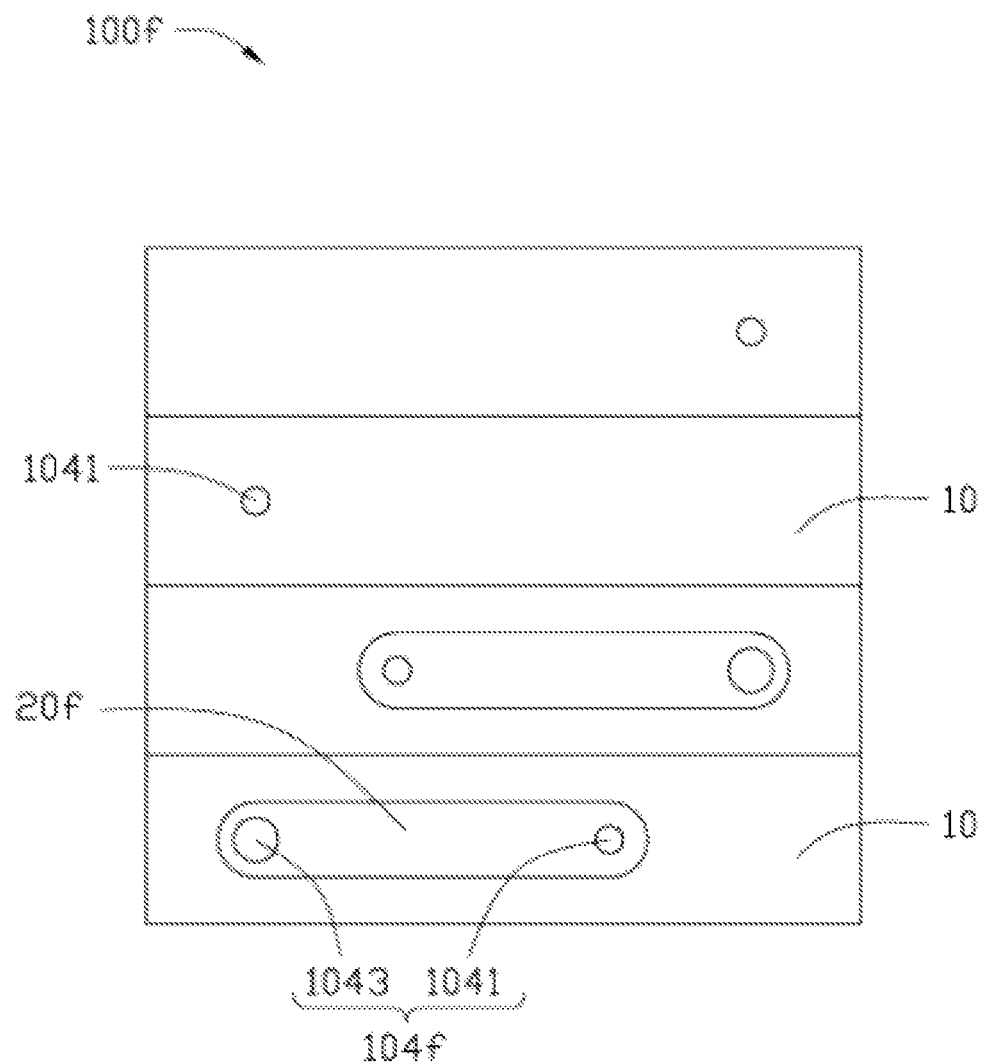
FIG. 20 and FIG. 21 are schematic structural diagrams of the battery module shown in FIG. 19 before and after fastening members are used.

Referring to FIG. 20, in the battery module 100f, a carrying portion 104f is provided on an outer wall of the battery cell 10 for carrying the fastening member 20f. The carrying portion 104f includes a rotating shaft 1043 and a pillar 1041 respectively provided on the outer wall of the battery cell 10. One end of the fastening member 20f is rotatably disposed on the rotating shaft 1043 and can slide in the axial direction of the rotating shaft 1043. The other end of the fastening member 20f can be retained by the pillar 1041 when the fastening member 20f is not in use; and is retained by another pillar 1041 provided on the battery cell 10 when the fastening member 20f is in use.

Figure 21:
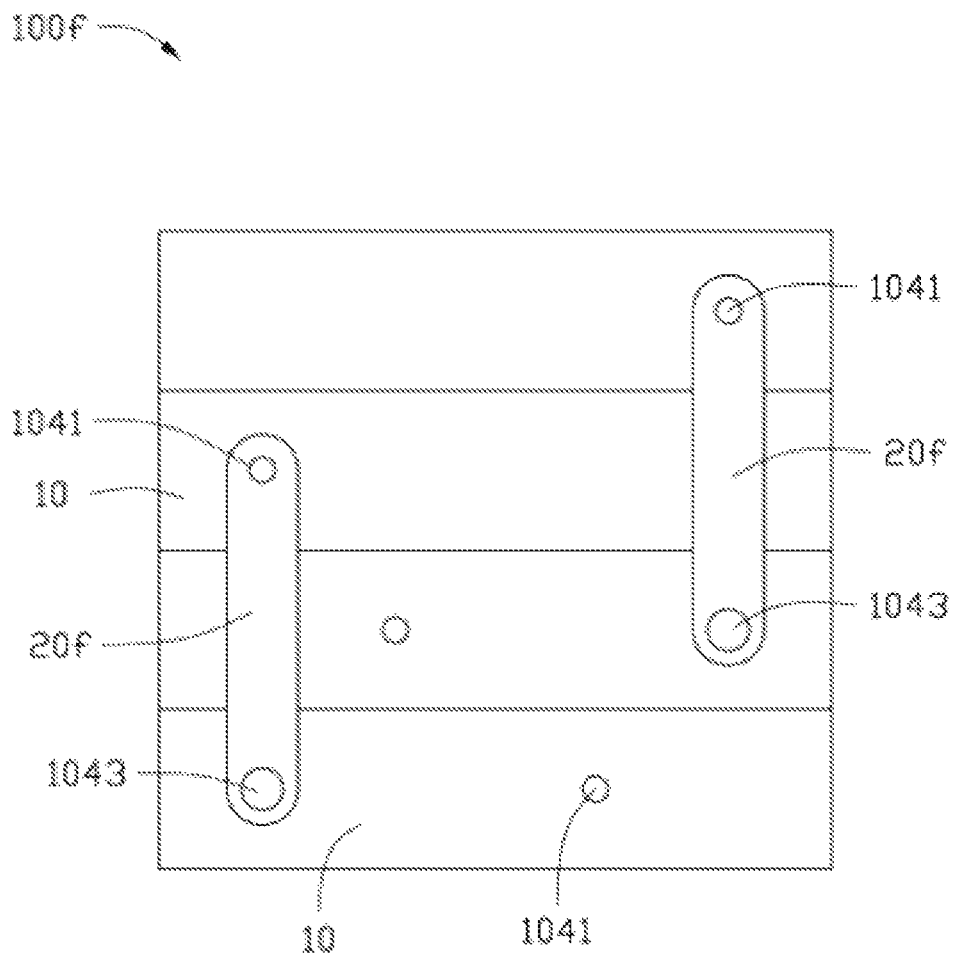

Referring to both FIG. 20 and FIG. 21, a battery module 100f includes four stacked battery cells 10. Two battery cells 10 with sorted sequence numbers 1 and 3, and 2 and 4 are connected and fastened by the fastening member 20f. One side of each of the two battery cells 10 with sorted sequence numbers 1 and 2 each carry a fastening member 20f. Another pillar 1041 corresponding to the rotating shaft 1043 of the battery cell 10 with a sorted sequence number 1 is provided on the battery cell 10 with a sorted sequence number 3. When the fastening member 20f is not in use, it is retained on the carrying portion 104f of the battery cells 10 with a sorted sequence number 1. When the fastening member 20f is in use, it slides along an axis of the rotating shaft 1043, so that the fastening member 20f is detached from the pillar 1041 of the carrying portion 104; the fastening member 20f rotates around the rotating shaft 1043, so that the fastening member 20f is aligned with the other pillar 1041 on the battery cell 10 with a sorted sequence number 3; and the fastening member 20f slides along the axis of the rotating shaft 1043, so that the fastening member 20f is retained by the pillar 1041 of the battery cell 10 with a sorted sequence number 3, and the fastening member 20f applies a tensile force to the two pillars 1041, to connect and fasten the two battery cells 10 with sorted sequence numbers 1 and 3.

It can be understood that in other embodiments, the fastening member 20f may alternatively be configured as a retractable and adjustable structure to increase the tensile force applied to the two pillars 1041.

Seventh Embodiment

Figure 22:
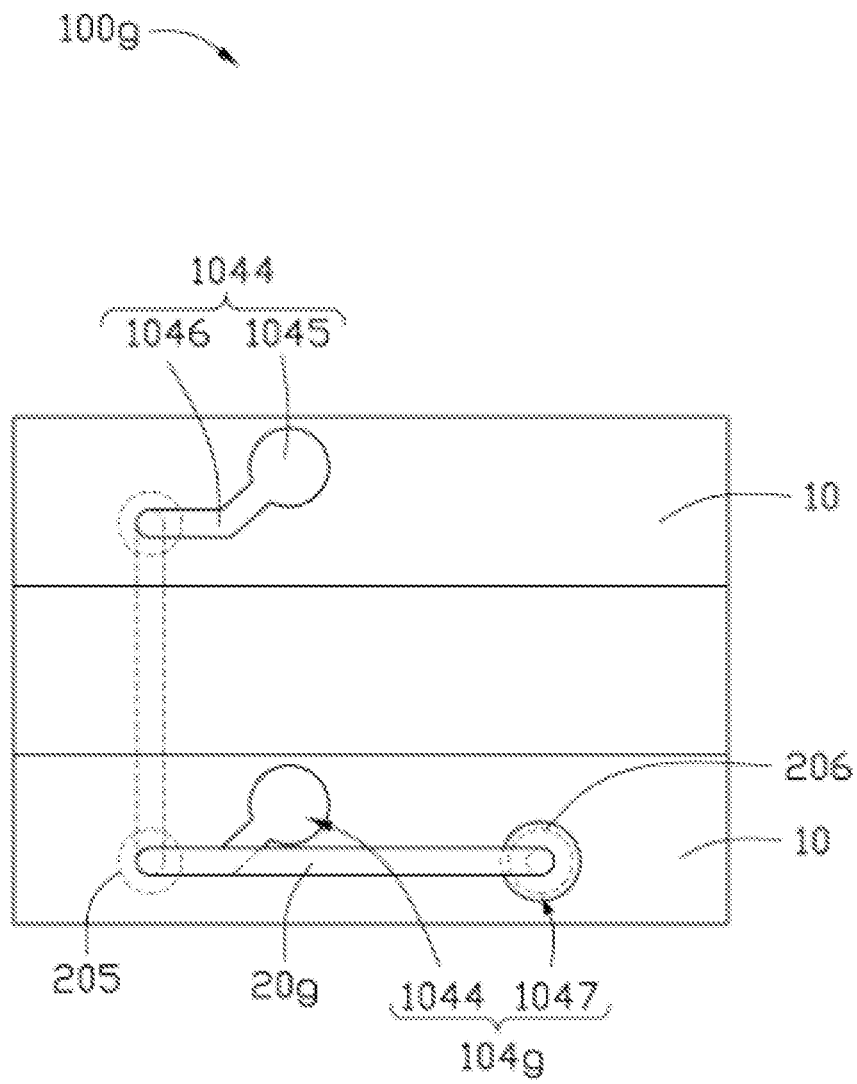
FIG. 22 is a schematic structural diagram of a battery module according to a seventh embodiment of this application.

Referring to FIG. 22, a battery module 100g includes three stacked battery cells 10. In the battery module 100g, a carrying portion 104g is provided on an outer wall of the battery cell 10 for carrying a fastening member 20g. The carrying portion 104g includes a sliding hole 1044 and a retaining hole 1047 respectively provided on the outer wall of the battery cell 10. The sliding hole 1044 includes an introduction portion 1045 and a fastening portion 1046 that intersecting with the introduction portion. Two ends of the fastening member 20g are each provided with a chuck 206 facing a side of the battery cell 10. One chuck 206 can enter from the introduction portion 1045 and slide along the introduction portion 1045 to the fastening portion 1046. The other chuck 206 can enter the retaining hole 1047 and be retained on the outer wall of the battery cell 10. The two chucks 206 of the fastening member 20g are retained in the fastening portions 1046 of the two battery cells 10.

The battery cell 10 with a sorted sequence number 1 is provided with the carrying portion 104g. The carrying portion 104g includes the sliding hole 1044 and the retaining hole 1047. Diameters of the introduction portion 1045 and the retaining hole 1047 are larger than an outer diameter of the chuck 206. The battery cell 10 with a sorted sequence number 3 is provided with another sliding hole 1044. When the fastening member 20g is not in use, one chuck 206 enters from the introduction portion 1045, and the chuck 206 is retained in the fastening portion 1046, and the other chuck 206 enters from the retaining hole 1047 and is retained on the outer wall of the battery cell 10. When the fastening member 20g is in use, it is rotated, so that the chuck 206 is removed from the retaining hole 1047, and the other chuck 206 slides along the fastening portion 1046; and the fastening member 20g is continued to be rotated, so that the chuck 206 is aligned with the introduction portion 1045 on the other battery cell 10. The fastening member 20g is moved and rotated, so that the two chucks 206 respectively enter the fastening portions 1046 on the two battery cells 10, and the fastening member 20g connects and fastens the two battery cells 10 with sorted sequence numbers 1 and 3.

Eighth Embodiment

Figure 23:
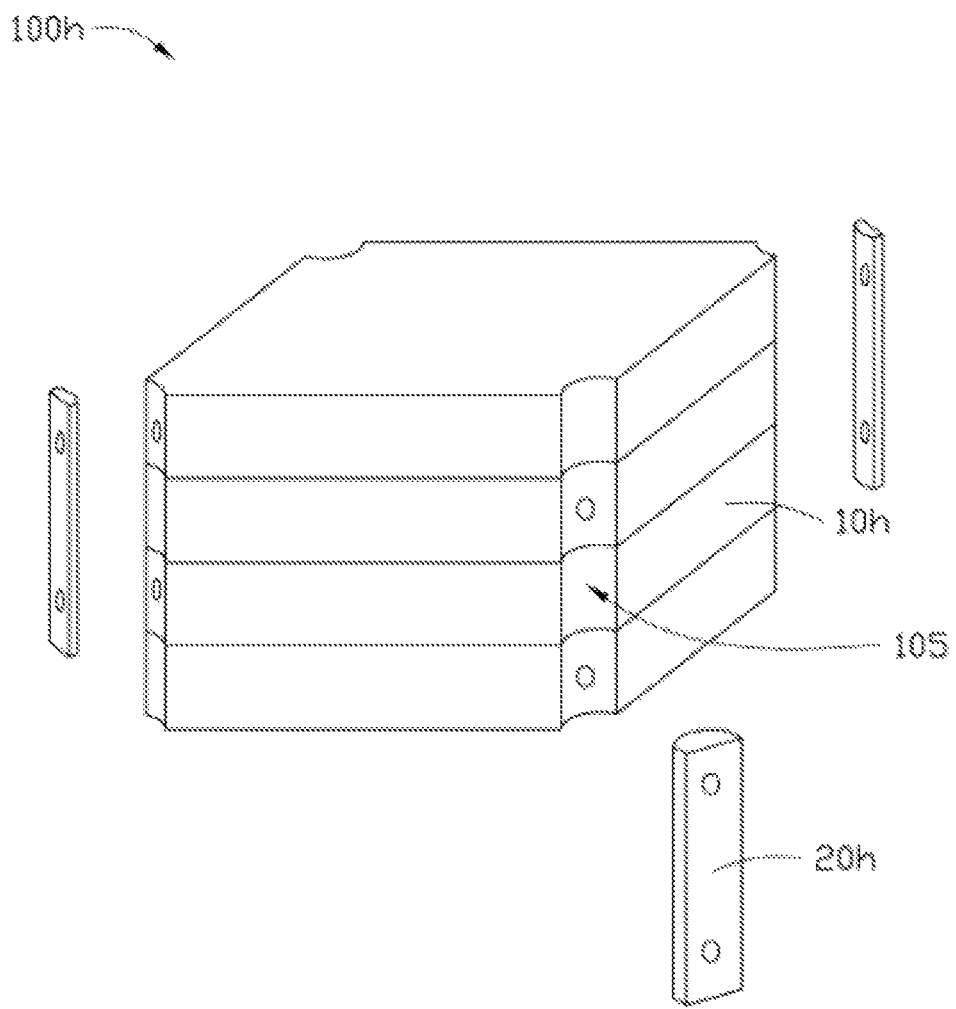
FIG. 23 is a schematic structural diagram of a battery module according to an eighth embodiment of this application.

Referring to FIG. 23, in a battery module 100h, accommodating grooves 105 are provided at four top corners of a battery cell 10h. Spaced-apart battery cells 10h are connected and fastened by using a fastening member 20h. The fastening member 20h is filled in the accommodating groove 105, and is fastened to the battery cell 10h by means of a buckle or a screw. A groove wall of the accommodating groove 105 abuts against the fastening member 20h, and when the battery cell 10h rotates in a plane, it is stopped by the fastening member 20h, and the fastening member 20h not only provides a force in a stacking direction, but also provides a force to block rotation of the battery cell 10*h* in a circumferential direction, further enhancing connection stability.

Ninth Embodiment

Figure 24:
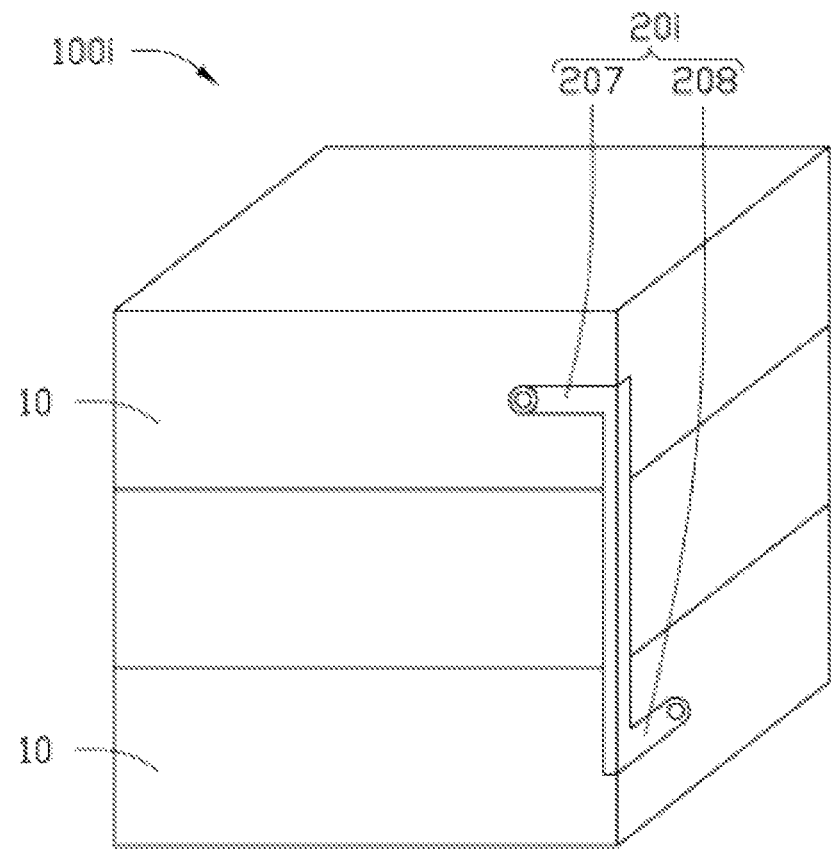
FIG. 24 is a schematic structural diagram of a battery module according to a ninth embodiment of this application.

Referring to FIG. 24, in a battery module 100*i*, a fastening member 20*i* is substantially an L-shaped plate structure. Specifically, the fastening member 20*i* includes a first connecting portion 207 and a second connecting portion 208 that are connected. The first connecting portion 207 and the second connecting portion 208 are located on two sides of a battery cell 10. The first connecting portion 207 is connected to one battery cell 10, and the second connecting portion 208 is connected to the other battery cell 10, so that the fastening member 20*i* connects and fastens the two spaced-apart battery cells 10.

Tenth Embodiment

Figure 25:
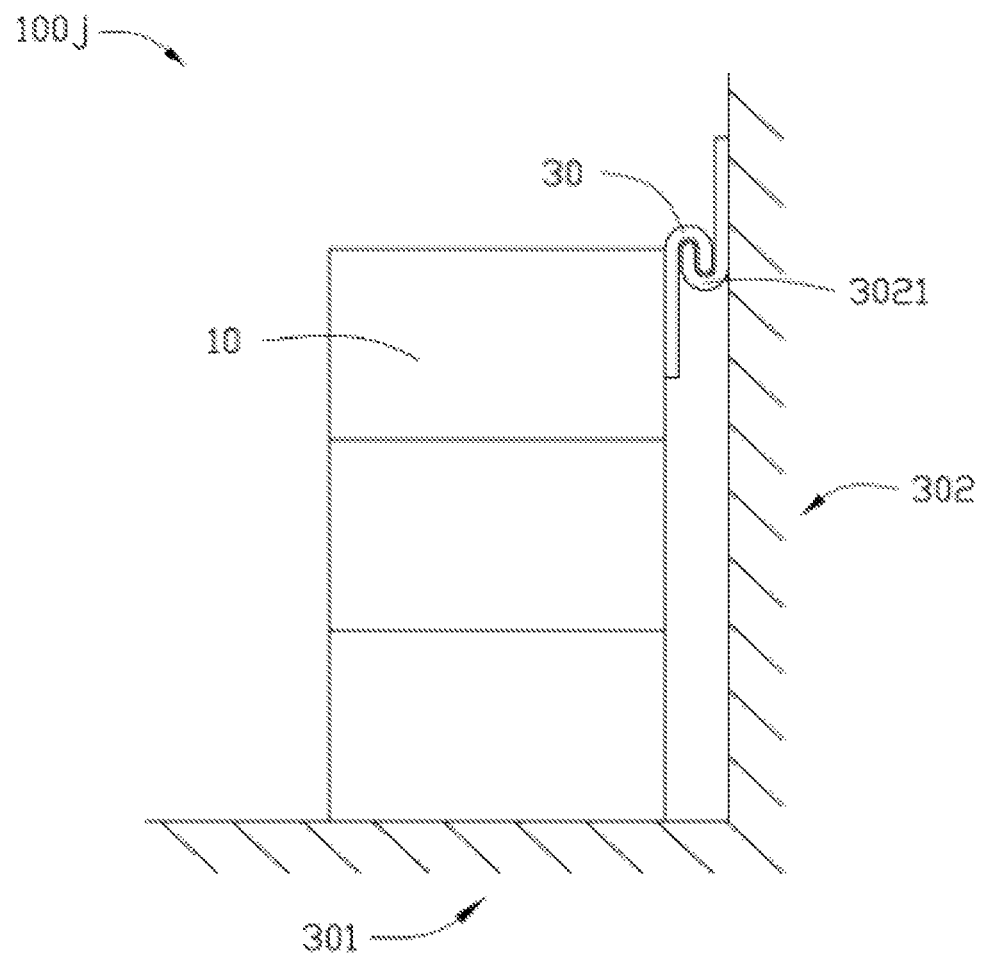
FIG. 25 is a schematic structural diagram of a battery module according to a tenth embodiment of this application.

Referring to FIG. 25, a battery module 100*j* includes at least one shackle 30 and N sequentially stacked battery cells 10. The N battery cells 10 are carried on a platform 301. A quantity of shackles 30 is one, but it is not limited thereto. The shackle 30 is disposed on one battery cell 10 and is configured to connect to a fastening mechanism 302. Specifically, a hook body 3021 adapted to the shackle 30 is provided on the fastening mechanism 302. The shackle 30 and the hook body 3021 are buckled and fastened. It can be understood that the shackle 30 may alternatively be a cyclic structure, and the cyclic structure is hitched on the hook body 3021 to achieve connection and fastening. Alternatively, in another embodiment, the shackle 30 has a cyclic structure, and is connected to a threaded hole provided on the fastening mechanism 302 by using, for example, a screw, to fasten the shackle 30 on the fastening mechanism 302.

The platform 301 is ground, and the fastening mechanism 302 is a wall that intersects the ground, but is not limited thereto. It can be understood that in other embodiments, the platform 301 and the fastening mechanism 302 may alternatively be two intersecting side walls on a device.

It can be understood that in other embodiments, a quantity of shackles 30 may alternatively be two or other numbers. Each battery cell 10 may be provided with at least one shackle 30 to fasten the battery cell 10 on the fastening mechanism 302. Alternatively, in another embodiment, two spaced-apart battery cells 10 are each provided with the shackle 30.

Two adjacent battery cells 10 are provided with the positioning structures such as the positioning portion 113 and the positioning groove 111 provided in the first embodiment, so that the two adjacent battery cells 10 are positioned in a circumferential plane. A shackle 30 is provided on one or more of the battery cells 10 to connect and fasten the fastening mechanism 302, so as to fasten the remaining battery cells 10.

It can be understood that in other embodiments, the two adjacent battery cells 10 may alternatively be positioned relative to each other by gravity and friction, and the positioning structures such as the positioning portion 113 and the positioning groove 111 provided in the first embodiment may alternatively be omitted.

Eleventh Embodiment

This application further provides an energy storage apparatus (not shown in the figure). The energy storage apparatus includes the battery module 100 (100*a*, 100*a*1, 100*b*, 100*c*, 100*d*, 100*e*, 100*f*, 100*g*, 100*h*, 100*i*, 100*j*) in the foregoing embodiments, and therefore has all the beneficial effects of the foregoing battery module. Details are not repeated herein. The energy storage apparatus further includes a battery management unit (Battery Management System) (not shown in the figure). The battery management unit is disposed the battery module 100 (100*a*, 100*a*1, 100*b*, 100*c*, 100*d*, 100*e*, 100*f*, 100*g*, 100*h*, 100*i*, 100*j*) for monitoring and managing the battery module 100, for example, monitoring a circuit, a voltage, a battery capacity, or the like of the battery module 100 (100*a*, 100*a*1, 100*b*, 100*c*, 100*d*, 100*e*, 100*f*, 100*g*, 100*h*, 100*i*, 100*j*) to ensure safety.

The energy storage apparatus may be cleaning equipment, an electric vehicle, a drone, an electric tool, or the like, but is not limited thereto.

It can be learned from the foregoing embodiments that in the foregoing battery module, there are fastening members provided on outer sides of the plurality of battery cells, and each of the fastening members connects and fastens two spaced-apart battery cells. The fastening members are easy to remove and install. By adding a quantity of battery cells in the stacking direction of the battery cells, and connecting and fastening the battery cells by using the fastening members, a power supply capacity is easy to expand.

The foregoing embodiments are merely intended to describe the technical solutions of this application, but not intended to constitute any limitation. Although this application is described in detail with reference to preferred embodiments, persons of ordinary skill in the art should understand that modifications or equivalent replacements can be made to the technical solutions of this application, without departing from the spirit and essence of the technical solutions of this application.

What is claimed is:

1. A battery module, comprising:
  a plurality of battery cells stacked in a stacking direction; and
  a plurality of fastening members, wherein each fastening member is provided with two connecting portions located on two opposite ends of the fastening member and the two connecting portions are respectively fastened to two spaced-apart battery cells that are separated by at least another battery cell along the stacking direction, and the plurality of fastening members are engaged with corresponding anchor points on a surface of the plurality of battery cells extending along the stacking direction such that the plurality of battery cells are integrated into one module by the plurality of fastening members and none of the anchor points serve as an electrode terminal of any of the plurality of battery cells; and the plurality of fastening members are engaged with corresponding anchor points on the surface of the plurality of battery cells extending along the stacking direction in at least three columns including at least one column sandwiched by another two columns in a direction perpendicular to the stacking direction of the plurality of battery cells.

2. The battery module according to claim 1, wherein each of the plurality of fastening members comprises an extension rod, and a length of the extension rod in the stacking direction of the plurality of battery cells is configured to be retractably adjusted and fixed.

3. The battery module according to claim 2, wherein the fastening member comprises a first connecting member, a second connecting member, and an adjusting member, wherein the first connecting member is connected to one battery cell, the second connecting member is connected to another battery cell, and two ends of the adjusting member are respectively connected to the first connecting member and the second connecting member for adjusting a spacing between the first connecting member and the second connecting member.

4. The battery module according to claim 3, wherein a first stud is provided on one end of the first connecting member: a second stud is provided on one end of the second connecting member: thread rotation directions of the first stud and the second stud are opposite; and the adjusting member is provided with a threaded hole, wherein the threaded hole is threadedly connected to the first stud and the second stud.

5. The battery module according to claim 3, wherein the adjusting member is a spring, and two ends of the adjusting member are respectively fastened to the first connecting member and the second connecting member.

6. The battery module according to claim 5, wherein the first connecting member is provided with a guide portion, the second connecting member is provided with a guide hole, and the guide portion is slidably disposed in the guide hole.

7. The battery module according to claim 1, wherein at least a first fastening member is connected to a first side of the plurality of battery cells, at least a second fastening member is connected to a second side of the plurality of battery cells, and the first and second fastening members provided on different battery cells and on different sides are connected.

8. The battery module according to claim 1, wherein in the stacking direction, two adjacent battery cells are electrically connected.

9. The battery module according to claim 8, wherein the two battery cells are electrically connected through a hot-plug component, wherein the hot-plug component comprises a hot-plug male end and a hot-plug female end, and in the two adjacent battery cells, one battery cell is provided with the hot-plug male end, and the other battery cell is provided with the hot-plug female end.

10. An energy storage apparatus, comprising the battery module according to claim 1, and further comprising a battery management unit, wherein the battery management unit is provided on the battery module for monitoring and managing the battery module.

* * * * *